United States Patent
Nagara et al.

(10) Patent No.: US 10,372,405 B2
(45) Date of Patent: Aug. 6, 2019

(54) IMAGE GENERATION DEVICE, PROGRAM, IMAGE DISPLAY SYSTEM, AND IMAGE DISPLAY DEVICE

(75) Inventors: Toru Nagara, Tokyo (JP); Tomoya Yamaura, Tokyo (JP); Kenji Fujisaka, Tokyo (JP); Ban Kawamura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/310,963

(22) Filed: Dec. 5, 2011

(65) Prior Publication Data

US 2012/0154386 A1 Jun. 21, 2012

(30) Foreign Application Priority Data

Dec. 16, 2010 (JP) ................. P2010-280809
Jun. 3, 2011 (JP) ................. P2011-125205

(51) Int. Cl.
*G06T 15/00* (2011.01)
*G06F 3/147* (2006.01)
(Continued)

(52) U.S. Cl.
CPC ............. *G06F 3/147* (2013.01); *G02B 27/26* (2013.01); *G09G 3/003* (2013.01); *G09G 3/20* (2013.01);
(Continued)

(58) Field of Classification Search
CPC .......... G06F 1/1641; G06F 2200/1614; G06F 1/165; G06F 1/1654; G06F 21/35; G06F 21/10; G06F 3/0481; G06F 9/445; G06F 2200/1637; G06F 3/1292; G06F 1/203; G06F 3/0488; G06F 3/017; G06F 3/0346; G06F 3/011; G06F 3/0412; H04N 5/23293; H04N 21/4312; H04N 5/23206; H04N 21/2393; H04N 2201/0094; H04N 19/70; H04N 1/00411; H04N 7/147; H04N 7/181; H04N 1/32523; H04N 1/32767;
(Continued)

(56) References Cited

U.S. PATENT DOCUMENTS

| 5,329,289 A | 7/1994 | Sakamoto et al. |
| 7,800,635 B2 * | 9/2010 | Kim ............... 345/659 |

(Continued)

FOREIGN PATENT DOCUMENTS

| CN | 1777184 A | 5/2006 |
| CN | 101779231 A | 7/2010 |

(Continued)

OTHER PUBLICATIONS

Partial European Search Report, EP 11192369, dated Mar. 15, 2012.

(Continued)

*Primary Examiner* — Xilin Guo

(74) *Attorney, Agent, or Firm* — Lerner, David, Littenberg, Krumholz & Mentlik, LLP

(57) ABSTRACT

According to an illustrative embodiment, an apparatus for generating image data is provided. The apparatus includes a communication unit for receiving information related to a display orientation of an image on a display unit of an image display device; and an image generation unit for generating image data according to the information.

28 Claims, 21 Drawing Sheets

(51) Int. Cl.
| | |
|---|---|
| *G02B 27/26* | (2006.01) |
| *G09G 3/00* | (2006.01) |
| *G09G 3/20* | (2006.01) |
| *G09G 5/00* | (2006.01) |
| *G09G 5/39* | (2006.01) |
| *H04N 21/2343* | (2011.01) |
| *H04N 21/258* | (2011.01) |
| *H04N 21/2662* | (2011.01) |
| *H04N 21/414* | (2011.01) |
| *H04N 21/81* | (2011.01) |
| *H04N 13/337* | (2018.01) |
| *H04N 13/139* | (2018.01) |
| *H04N 13/398* | (2018.01) |

(52) U.S. Cl.
CPC ............. *G09G 5/005* (2013.01); *G09G 5/006* (2013.01); *G09G 5/39* (2013.01); *H04N 13/139* (2018.05); *H04N 13/337* (2018.05); *H04N 13/398* (2018.05); *H04N 21/234309* (2013.01); *H04N 21/25825* (2013.01); *H04N 21/2662* (2013.01); *H04N 21/41407* (2013.01); *H04N 21/816* (2013.01); *G06F 2200/1637* (2013.01); *G09G 2340/0442* (2013.01); *G09G 2340/0492* (2013.01); *G09G 2370/04* (2013.01); *G09G 2370/16* (2013.01)

(58) Field of Classification Search
CPC .. H04N 1/50; H04N 21/2343; H04N 5/23216; H04N 7/183; H04W 4/026; H04W 84/12; H04W 72/0413; H04W 72/0406; H04W 52/0225; H04W 76/15; H04W 36/0022; H04W 92/18; H04L 61/6022; H04L 67/42; H04L 63/08; H04L 67/10; H04L 67/34; H04L 43/16; H04L 5/14; H04L 12/2807; H04L 51/04; H01L 29/785; H01L 27/11519; G09G 2340/0492; G09G 5/38

See application file for complete search history.

(56) References Cited

U.S. PATENT DOCUMENTS

| | | | |
|---|---|---|---|
| 2004/0140971 A1* | 7/2004 | Yamazaki et al. ............. 345/204 |
| 2004/0204134 A1* | 10/2004 | Khazaka et al. .............. 455/566 |
| 2006/0105816 A1* | 5/2006 | Hwang ................. H04M 1/021 | |
| | | | 455/566 |
| 2006/0184532 A1* | 8/2006 | Hamada ................. G06F 3/1454 |
| 2007/0046697 A1 | 3/2007 | Hussain |
| 2007/0085759 A1* | 4/2007 | Lee et al. ........................ 345/1.1 |
| 2007/0180270 A1* | 8/2007 | Kumagai ................. G06F 21/72 | |
| | | | 713/193 |
| 2007/0265031 A1* | 11/2007 | Koizumi et al. ............ 455/556.1 |
| 2007/0273609 A1 | 11/2007 | Yamaguchi et al. |
| 2008/0045149 A1* | 2/2008 | Dharmaraju et al. .......... 455/39 |
| 2009/0070415 A1* | 3/2009 | Kishi et al. .................... 709/203 |
| 2009/0167736 A1 | 7/2009 | Seydoux |
| 2009/0303204 A1* | 12/2009 | Nasiri ...................... A63F 13/06 | |
| | | | 345/184 |
| 2010/0118044 A1 | 5/2010 | Ishihara |
| 2010/0166017 A1* | 7/2010 | Na ...................... H04L 12/4633 | |
| | | | 370/474 |
| 2010/0182402 A1* | 7/2010 | Nakajima et al. .............. 348/42 |
| 2010/0194963 A1* | 8/2010 | Terashima ............... 348/333.11 |
| 2011/0069689 A1* | 3/2011 | Grandhi et al. .............. 370/338 |
| 2011/0074928 A1* | 3/2011 | Misawa ......................... 348/47 |
| 2011/0141235 A1* | 6/2011 | Tsukagoshi .................... 348/43 |
| 2011/0145421 A1* | 6/2011 | Yao ...................... H04W 76/023 | |
| | | | 709/228 |
| 2011/0169865 A1* | 7/2011 | Hagiwara ..................... 345/659 |
| 2011/0216153 A1* | 9/2011 | Tasker ....................... 348/14.02 |
| 2011/0310094 A1* | 12/2011 | Park ...................... G06F 1/1626 | |
| | | | 345/419 |
| 2012/0019557 A1* | 1/2012 | Aronsson et al. ............ 345/633 |
| 2012/0120050 A1* | 5/2012 | Hemminki ................... 345/419 |

FOREIGN PATENT DOCUMENTS

| | | |
|---|---|---|
| JP | 08-129557 A | 5/1996 |
| JP | H09159970 A | 6/1997 |
| JP | 2001075546 A | 3/2001 |
| JP | 2001092439 A | 4/2001 |
| JP | 2003162277 A | 6/2003 |
| JP | 2004184560 A | 7/2004 |
| JP | 2006172281 A | 6/2006 |
| JP | 2010175643 A | 8/2010 |
| JP | 2010-250257 A | 11/2010 |
| WO | 2008030005 A1 | 3/2008 |

OTHER PUBLICATIONS

European Office Action for EP Application No. 11192369.4, dated Nov. 26, 2014.
Japanese Office Action for JP Application No. 2011125205, dated Jan. 27, 2015.
EP Communication for Application No. 11192369.4, Pursuant to Article 94(3), dated Nov. 16, 2015.
Chinese Office Action for CN Application No. 201110415133.1, dated Nov. 4, 2015.
Extended European Search Report for Application No. EP16159159.9 dated Jul. 27, 2016.
Chinese Office Action for Application No. 201110415133.1 dated Dec. 21, 2016.
European Search Report for EP 18156117.6 dated May 11, 2018.
Communication pursuant to Artcile 94(3) EPC for EP18156117.6 dated May 31, 2018.
Chinese Office Action for CN Application No. 201610111898.9, dated Nov. 8, 2018.
EP Communication for Appication No. 11192369.4, Pursuant to Article 94(3), dated Jul. 3, 2015.

* cited by examiner

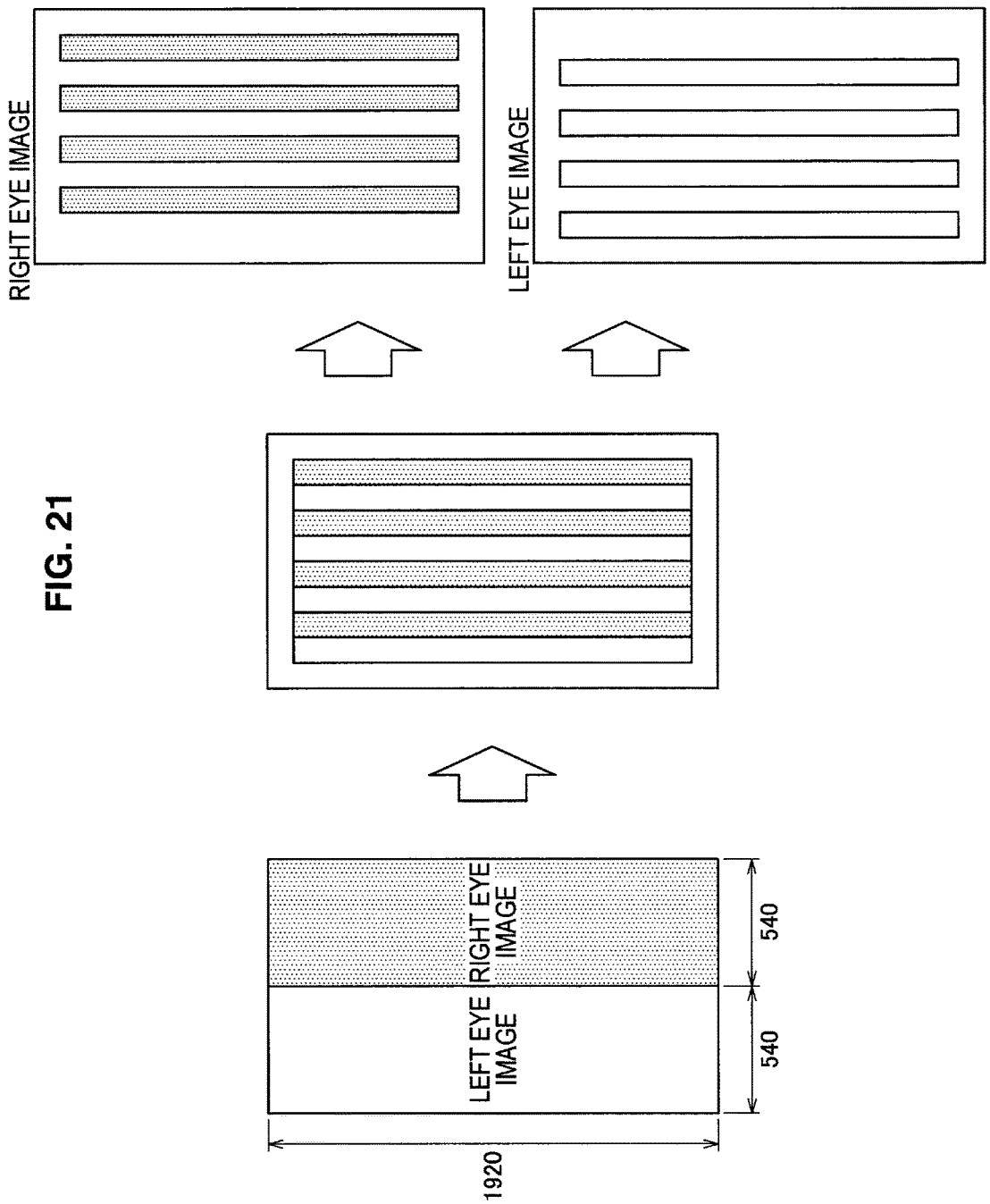

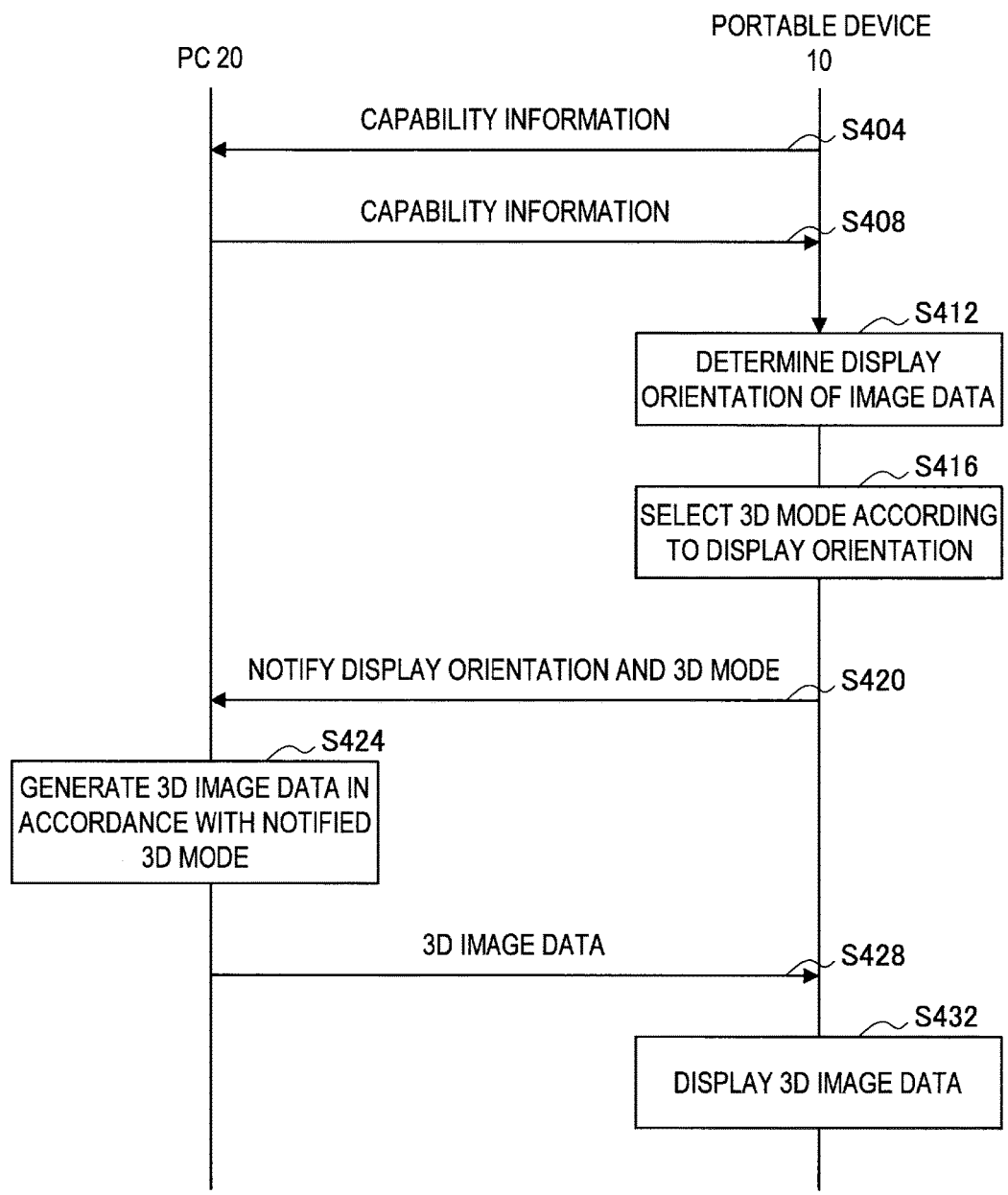

IMAGE GENERATION DEVICE, PROGRAM, IMAGE DISPLAY SYSTEM, AND IMAGE DISPLAY DEVICE

CROSS-REFERENCE TO RELATED APPLICATION

The present application claims priority from Japanese Patent Application Nos. JP 2010-280809 filed on Dec. 16, 2010 and JP 2011-125205 filed on Jun. 3, 2011 in the Japanese Patent Office, the entire contents of which are incorporated herein by reference.

The present disclosure relates to an image generation device, a program, an image display system, and an image display device.

BACKGROUND

The present disclosure relates to an image generation device, a program, an image display system, and an image display device.

A wireless LAN (Local Area Network) system as typified by IEEE (Institute of Electrical and Electronics Engineers) 802.11 is becoming increasingly common in place of a wired network for its advantages such as high flexibility of equipment.

A wireless LAN system standardized by the IEEE 802.11 is composed of a group of wireless communication devices which are an access point operating as a master unit and a plurality of stations operating as slave units, and a plurality of stations are connected to one access point.

Further, according to Wi-Fi Direct under Wi-Fi Alliance standard development, it is proposed to form a communication group by determining which of a group owner and a client each of a plurality of wireless communication devices acts as. The group owner operates as a simplified access point and has a function to connect one or two or more clients.

On the other hand, a portable device that has a display screen and changes the display orientation of an image on the display screen in accordance with the posture of the device is in widespread use. For example, the portable device displays an image of which the layout, the resolution and the like are tailored to portrait when having the posture in which the short side of the display screen is along the horizontal direction and the long side thereof is along the vertical direction, and displays an image of which the layout, the resolution and the like are tailored to landscape when having the posture in which the short side of the display screen is along the vertical direction and the long side thereof is along the horizontal direction. Note that such a portable device is disclosed in Japanese Unexamined Patent Application Publication No. H08-129557, for example.

SUMMARY

However, in the case where the above-described portable device connects with an image transmitting device according to Wi-Fi Direct and displays image data transmitted from the image transmitting device, the image data transmitted from the image transmitting device does not depend on the posture of the portable device. This raises a problem that, although the portable device can scale up or down the received image data to fit the size of the portrait or landscape display screen, it is difficult to display image data of which the layout, the resolution and the like are tailored to the display orientation.

In light of the foregoing, it is desirable to provide novel and improved image generation device, program, image display system, and image display device that enable the image display device to receive and display image data conforming to the display orientation.

In view of the above, the present embodiments are provided. According to an illustrative embodiment, an apparatus for generating image data is provided. The apparatus includes a communication unit for receiving information related to a display orientation of an image on a display unit of an image display device; and an image generation unit for generating image data according to the information.

According to the embodiments of the present disclosure, the image display device can receive and display image data conforming to the display orientation.

BRIEF DESCRIPTION OF THE DRAWINGS

FIG. 21 is an explanatory view illustrating a case where the display orientation of an image on a display unit 12 is vertical; and FIG. 22 is a sequence chart illustrating operations of a portable device 10 and a PC 20 according to the second embodiment.

DETAILED DESCRIPTION OF THE EMBODIMENT(S)

Figure 1:
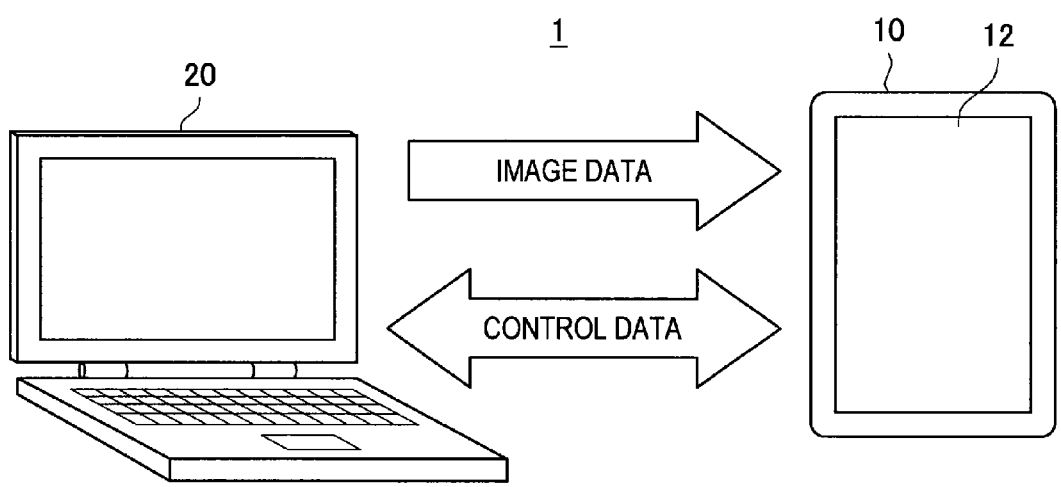
FIG. 1 is an explanatory view illustrating a configuration of an image display system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. However, when there is no particular need to distinguish between a plurality of structural elements having the same function, they are denoted by the same reference numeral.

Further, "DETAILED DESCRIPTION OF THE EMBODIMENTS" will be described in the following order.
1. Overview of Image Display System
2. Hardware Configuration
3. Functions of PC and Portable Device
4. Operation of Image Display System
5. Second Embodiment
6. Summary

1. Overview of Image Display System

FIG. 1 is an explanatory view illustrating a configuration of an image display system 1 according to an embodiment of the present disclosure. Referring to FIG. 1, the image display system 1 according to the embodiment of the disclosure includes a portable device 10 and a PC (Personal Computer) 20.

The PC 20 has a function of connecting and wirelessly communicating with a nearby wireless communication device such as the portable device 10. For example, the PC 20 can form a communication group with the portable device 10 according to Wi-Fi Direct under Wi-Fi Alliance standard development and wirelessly communicate with the portable device 10 in the communication group without through an access point.

Further, the PC 20, forming the communication group with the portable device 10, can transmit content data, control data and the like to the portable device 10. In this specification, an embodiment in which image data composed of a plurality of frame images is transmitted as an example of the content data is mainly described. The image data may be data such as movie, television program or video program, a user's work screen in the PC 20, or a display screen of a game. The content data, however, is not limited to the image data, and audio data such as music, lecture, or radio program may be transmitted as the content data from the PC 20.

A layer in which the image data and the control data are communicated is described hereinafter with reference to FIG. 2.

Figure 2:
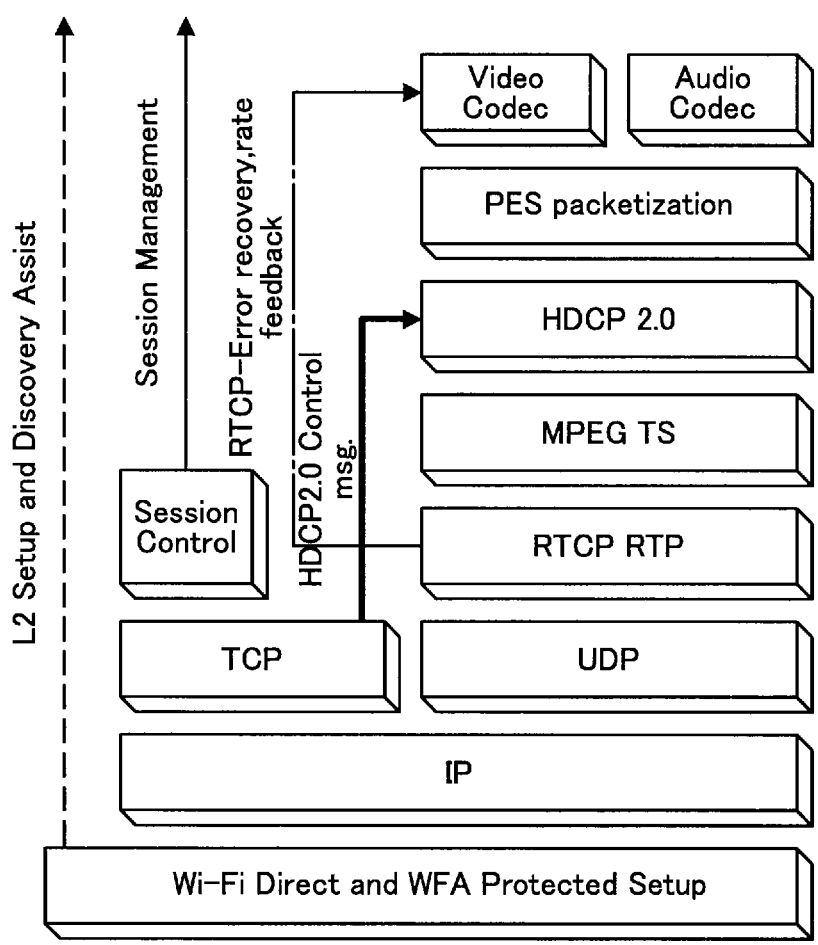
FIG. 2 is an explanatory view illustrating a software concept of a PC.

FIG. 2 is an explanatory view illustrating a software concept of the PC 20. Referring to FIG. 2, the content data such as the image data is transmitted using MPEG-TS/RTP/ UDP/IP and the like. On the other hand, the control data is transmitted through a communication path different from that of the image data, such as TCP/IP or L2 layer.

Note that FIG. 1 shows the PC 20 as an example of the image generation device, and the image generation device is not limited to the PC 20. For example, the image generation device may be an information processing device such as a home video processing device (e.g. a DVD recorder, a videocassette recorder etc.), a PDA (Personal Digital Assistants), a home game machine, a portable video processing device, a portable game machine or an electrical household appliance.

The portable device 10 has a function of connecting and wirelessly communicating with a nearby wireless communication device such as the PC 20. For example, the portable device 10 can form a communication group with the PC according to Wi-Fi Direct under Wi-Fi Alliance standard development and wirelessly communicate with the PC 20 in the communication group without through an access point. Note that the portable device 10 and the PC 20 can perform direct communication using IEEE802.11z (TDLS), for example, even when they are connected to the same access point.

Further, the portable device 10, forming the communication group with the PC 20, can receive the image data transmitted form the PC 20 and display the received image data on the display unit 12.

Note that FIG. 1 shows the portable device 10 as an example of the image display device, and the image display device is not limited to the portable device 10. For example, the image display device may be any information processing device having a display function, such as a cellular phone, a portable game machine or an imaging device.

Further, although an example in which a wireless communication function is implemented in the portable device 10 and the PC 20 is illustrated in FIG. 1, the embodiment is not limited to such an example. For example, an adapter having a wireless communication function, an image data encoding function and a packetization function may be externally attached to the PC 20. Likewise, an adapter having a wireless communication function, an image data decoding function and the like may be externally attached to the portable device 10.

As described above, because the portable device 10 and the PC 20 perform wireless communication directly without through an access point according to the embodiment, low delay can be achieved with a rate transmission utilizing a radio performance. Further, by use of slice transmission described hereinbelow, still lower delay can be achieved.

The slice transmission is a method that transmits data by dividing each frame image into a plurality of slices. The slice transmission has an advantage that the receiving end can start reproduction of each slice without waiting for receiving all frame images.

Figure 3:
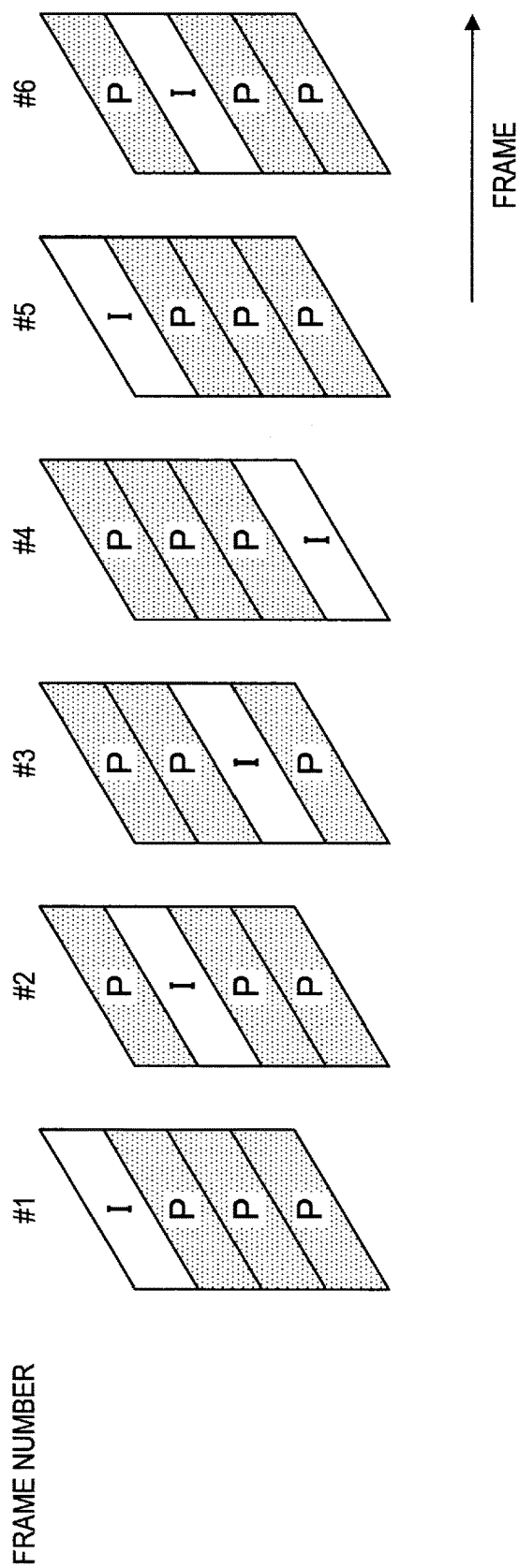
FIG. 3 is an explanatory view illustrating a specific example of each frame image transmitted by slice transmission.

FIG. 3 is an explanatory view illustrating a specific example of each frame image transmitted by the slice transmission. Referring to FIG. 3, each frame image transmitted by the slice transmission is divided into a plurality of slices, and each slice is I-slice or P-slice compressed by AVC. Further, the transmitting end makes the slice position of I-slice vary from frame image to frame image. In the example shown in FIG. 3, the highest slice is I-slice in the frame image #1, and the second highest slice is I-slice in the frame image #2.

In this manner, because the slice transmission allows I-slice and P-slice to coexist in one frame image, a rate can be stabilized, and a buffer length to be used can be reduced, thereby achieving low delay.

(Circumstances of Development of the Embodiment)

Incidentally, the portable device 10 includes a sensor (160) for detecting the posture of the portable device 10 and can process and display the image data in accordance with the posture. This point is specifically described with reference to FIG. 4.

Figure 4:
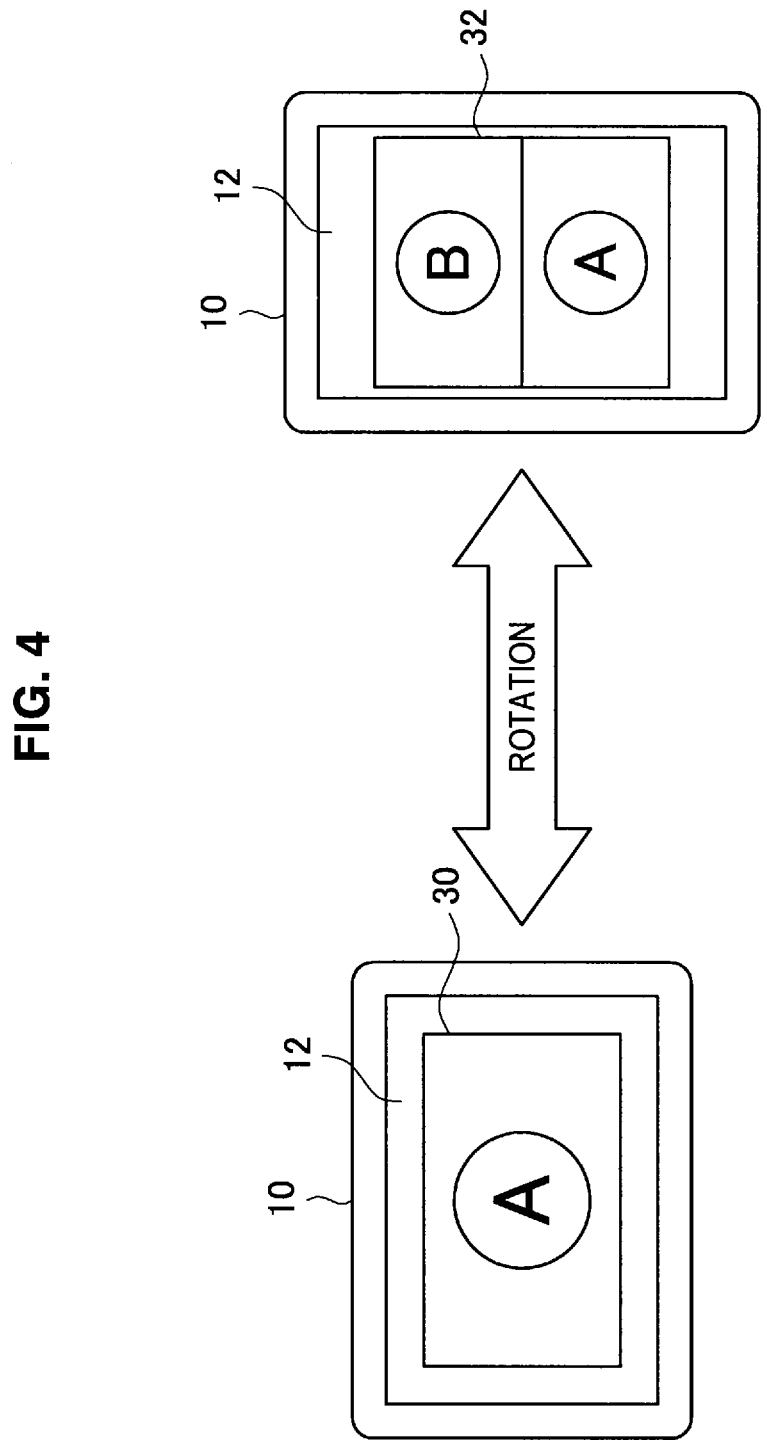
FIG. 4 is an explanatory view illustrating the way a display image varies in accordance with the posture of a portable device.

FIG. 4 is an explanatory view illustrating the way a display image varies in accordance with the posture of the portable device 10. Referring to FIG. 4, the portable device 10 displays an image 30 of which the layout is tailored to landscape when having the posture (hereinafter referred to as the horizontal posture) in which the short side of the display unit 12 is along the vertical direction and the long side thereof is along the horizontal direction. On the other hand, the portable device 10 displays an image 32 of which the layout is tailored to portrait when having the posture (hereinafter referred to as the vertical posture) in which the short side of the display unit 12 is along the horizontal direction and the long side thereof is along the vertical direction.

Therefore, a user can change the display orientation of an image (in relative to the portable device 10) by rotating the portable device 10 with the display unit 12 along the vertical direction, for example. Note that the portable device 10 may change the display orientation of an image according to an instruction from a user or may change the display orientation of an image in accordance with the relative positioning between a user's face and the display unit 12.

However, in the case where a portable device and a PC according to a comparative example are connected, and the portable device displays image data transmitted from the PC, the image data transmitted from the PC does not depend on the posture of the portable device. This raises a problem that, although the portable device can scale up or down the received image data to fit the size of the portrait or landscape display screen, it is difficult to display image data of which the layout, the resolution and the like are tailored to the display orientation.

Figure 5:
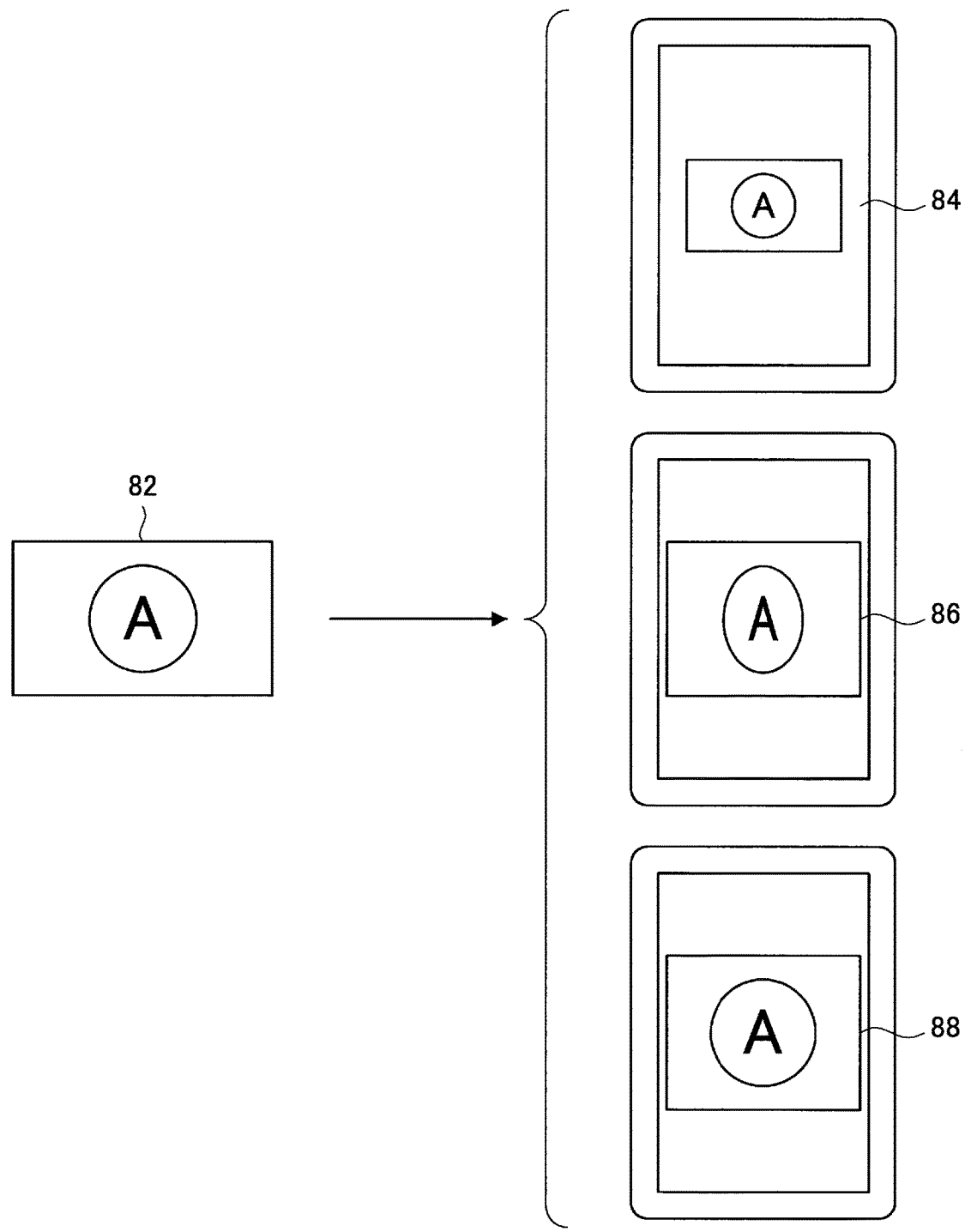
FIG. 5 is an explanatory view illustrating a comparative example of the present disclosure.

For example, when a landscape image 82 is transmitted from the PC without depending on the posture of the portable device as shown in FIG. 5, the vertically-oriented portable device can display an image 84 created by scaling down the image 82, an image 86 created by compressing the image 82 in the horizontal direction, an image 88 created by cutting off the both ends of the image 82 and the like. However, it is difficult to display an image 32 of which the layout is tailored to portrait as shown in FIG. 4.

Given such circumstances, an embodiment of the present disclosure has been invented. In the image display system 1 according to an embodiment of the present disclosure, the portable device 10 can receive and display image data conforming to the display orientation. Te embodiment of the present disclosure is described in detail hereinbelow.

2. Hardware Configuration

Figure 6:
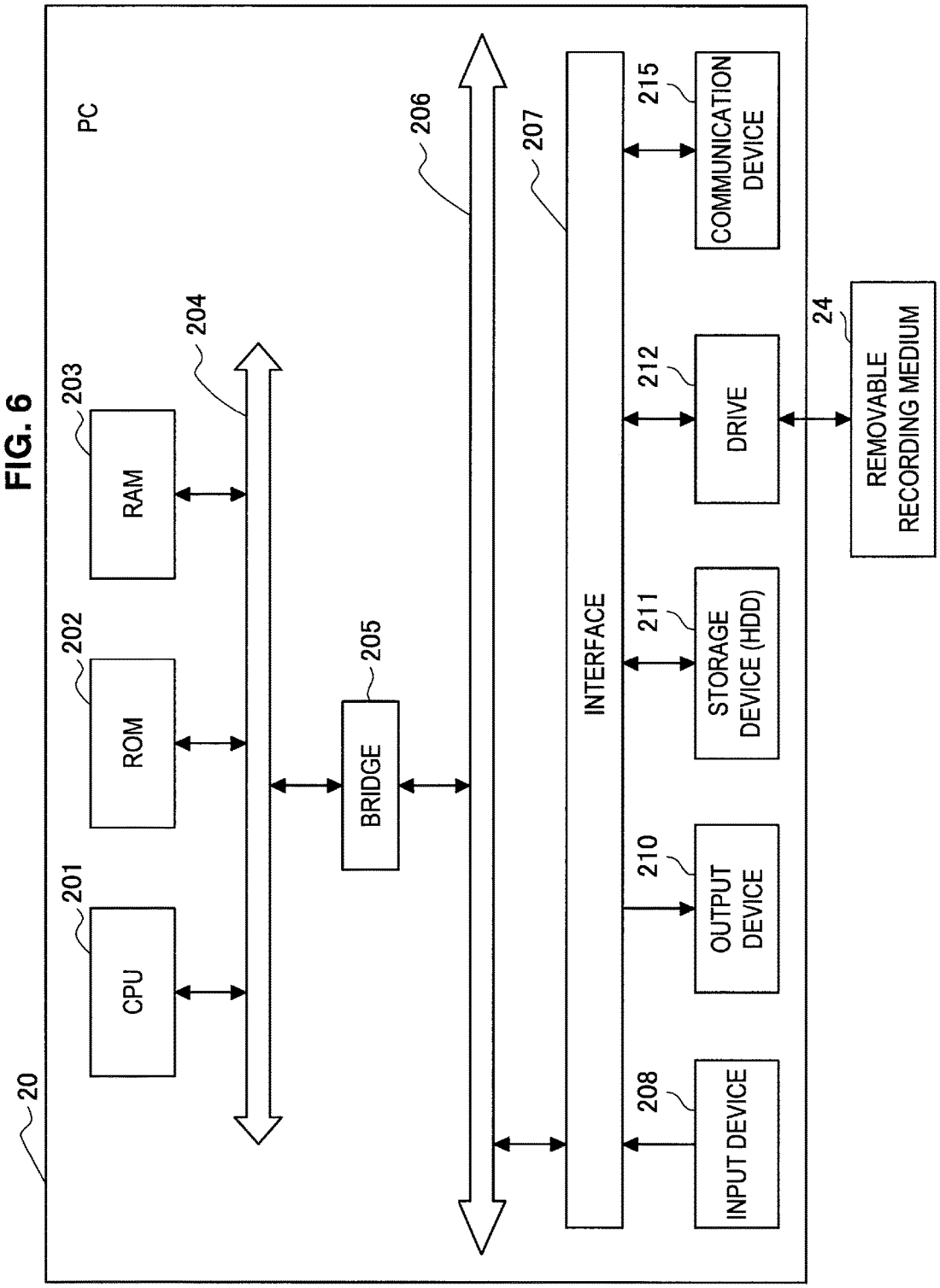
FIG. 6 is an explanatory view illustrating a hardware configuration of a PC according to an embodiment of the present disclosure.

FIG. 6 is an explanatory view illustrating a hardware configuration of the PC 20 according to the embodiment of the disclosure. The PC 20 includes a CPU (Central Processing Unit) 201, a ROM (Read Only Memory) 202, a RAM (Random Access Memory) 203, and a host bus 204. The PC 20 further includes a bridge 205, an external bus 206, an interface 207, an input device 208, an output device 210, a storage device (HDD) 211, a drive 212, and a communication device 215.

The CPU 201 functions as a processing device and a control device, and it controls the overall operation in the PC 20 according to programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch or a lever, and an input control circuit for generating an input signal based on a user input and outputting it to the CPU 201, for example. A user of the PC 20 manipulates the input device 208 to thereby input various kinds of data or instruct processing operations to the PC 20.

The output device 210 may include a display device such as a CRT (Cathode Ray Tube) display device, an LCD (Liquid Crystal Display) device, an OLED (Organic Light Emitting Display) device or a lamp, for example. Further, the output device 210 may include an audio output device such as a speaker or a headphone, for example. The output device 210 outputs reproduced contents, for example. Specifically, the display device displays various kinds of information such as reproduced video data by texts or images. On the other hand, the audio output device converts reproduced audio data or the like into sound and outputs the sound.

The storage device 211 is a device for data storage that is configured as an example of a storage unit of the PC 20 according to the embodiment. The storage device 211 may include a storage medium, a recording device to record data into the storage medium, a reading device to read data from the storage medium, a deleting device to delete data recorded in the storage medium or the like. The storage device 211 may be an HDD (Hard Disk Drive), for example. The storage unit 211 drives a hard disk and stores programs to be executed by the CPU 201 and various data.

The drive 212 is a reader/writer for storage medium, and it may be incorporated into the PC 20 or attached thereto externally. The drive 212 reads information recorded in a removable storage medium 24 such as a magnetic disk, an optical disk, a magneto-optical disk or a semiconductor memory which is attached thereto and outputs the information to the RAM 203. Further, the drive 212 can write information to the removable storage medium 24.

The communication device 215 is a communication interface configured by a communication device or the like to establish a connection with a nearby wireless communication device or a network, for example. The communication device 215 may be a communication device compatible with a wireless LAN (Local Area Network), a communication device compatible with LTE (Long Term Evolution), or a wire communication device that performs wired communication.

Note that although the hardware configuration of the PC 20 is described above with reference to FIG. 6, the hardware of the portable device 10 may be configured in substantially the same manner as that of the PC 20, and an explanation thereof is omitted.

3. Functions of PC and Portable Device

The hardware configurations of the portable device 10 and the PC 20 are described above with reference to FIG. 6. Hereinafter, the functions of the portable device 10 and the PC 20 are described with reference to FIGS. 7 to 11.

Figure 7:
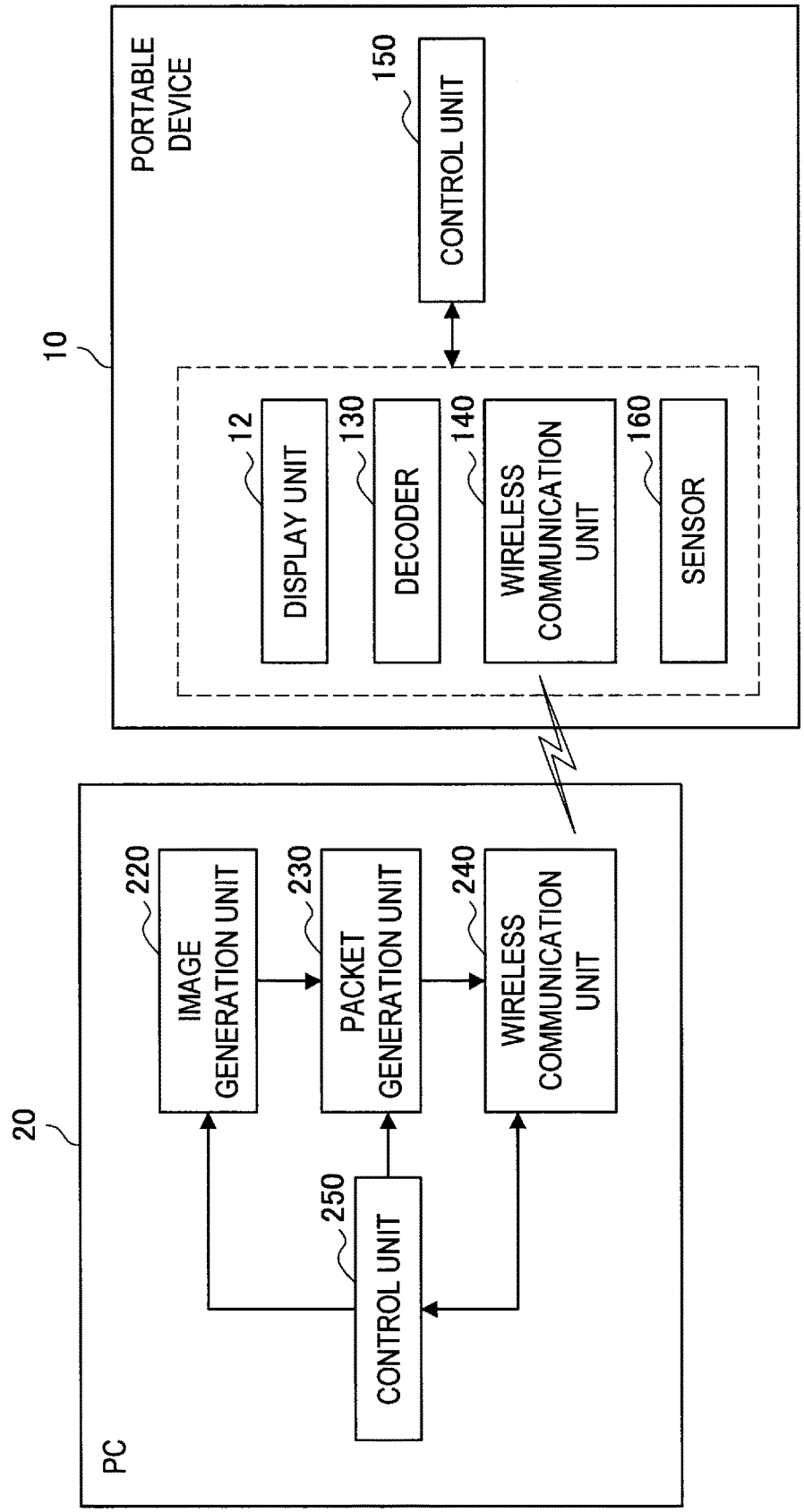
FIG. 7 is a functional block diagram illustrating configurations of a portable device and a PC.

FIG. 7 is a functional block diagram illustrating the configurations of the portable device 10 and the PC 20. Referring to FIG. 7, the portable device 10 includes a display unit 12, a decoder 130, a wireless communication unit 140, a control unit 150, and a sensor 160. The PC 20 includes an image generation unit 220, a packet generation unit 230, a wireless communication unit 240, and a control unit 250.

The image generation unit 220 generates image data to be displayed on the portable device 10. For example, the image generation unit 220 generates image data such as movie or television program stored in the PC 20, a user's work screen in the PC 20, or a display screen of a game.

Further, the image generation unit 220 generates image data tailed to the display orientation in the portable device 10 according to control by the control unit 250. For example, the image generation unit 220 may generate image data of which the layout, the resolution and the like are tailed to the vertical orientation (portrait) when the display orientation in the portable device 10 is vertical, and generate image data of which the layout, the resolution and the like are tailed to the horizontal orientation (landscape) when the display orientation in the portable device 10 is horizontal.

The packet generation unit 230 generates packets for wireless transmission from the image data and the like supplied from the image generation unit 220. Hereinafter, the detailed configuration of the packet generation unit 230 is described with reference to FIGS. 8 and 9.

Figure 8:
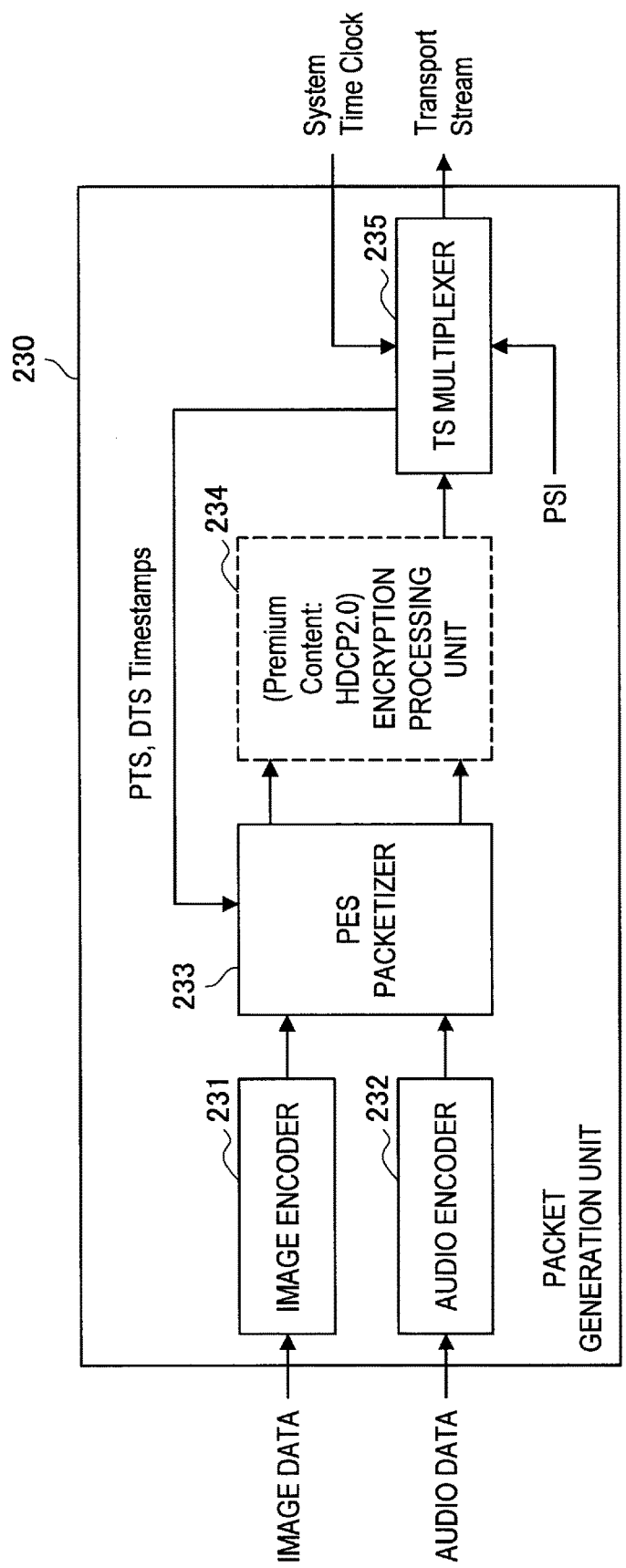
FIG. 8 is an explanatory view illustrating a configuration of a packet generation unit.

FIG. 8 is an explanatory view illustrating a configuration of the packet generation unit 230. Referring to FIG. 8, the packet generation unit 230 includes an image encoder 231, an audio encoder 232, a PES packetizer 233, an encryption processing unit 234, and a TS multiplexer 235.

The image encoder 231 performs compression encoding of supplied image data and outputs the image data. Likewise, the audio encoder 232 performs compression encoding of supplied audio data and outputs the audio data. Note that the image encoder 231 and the audio encoder 232 can change the compressibility of each data according to an instruction from the control unit 250.

The PES packetizer 233 generates PES packets from the image data output from the image encoder 231 and the audio data output from the audio encoder 232. To be more specific, the PES packetizer 233 generates a PES packet composed of PES header and PES payload as shown in (1) of FIG. 9. The PES header includes a field for describing timing information such as DTS (Decoding Time Stamp) or PTS (Presentation Time Stamp).

The encryption processing unit 234 encrypts the PES packet supplied from the PES packetizer 233 and outputs the packet. The encryption processing unit 234 may encrypt the PES packet by HDCP (High-bandwidth Digital Content Protection) system 2.0, for example.

Figure 9:
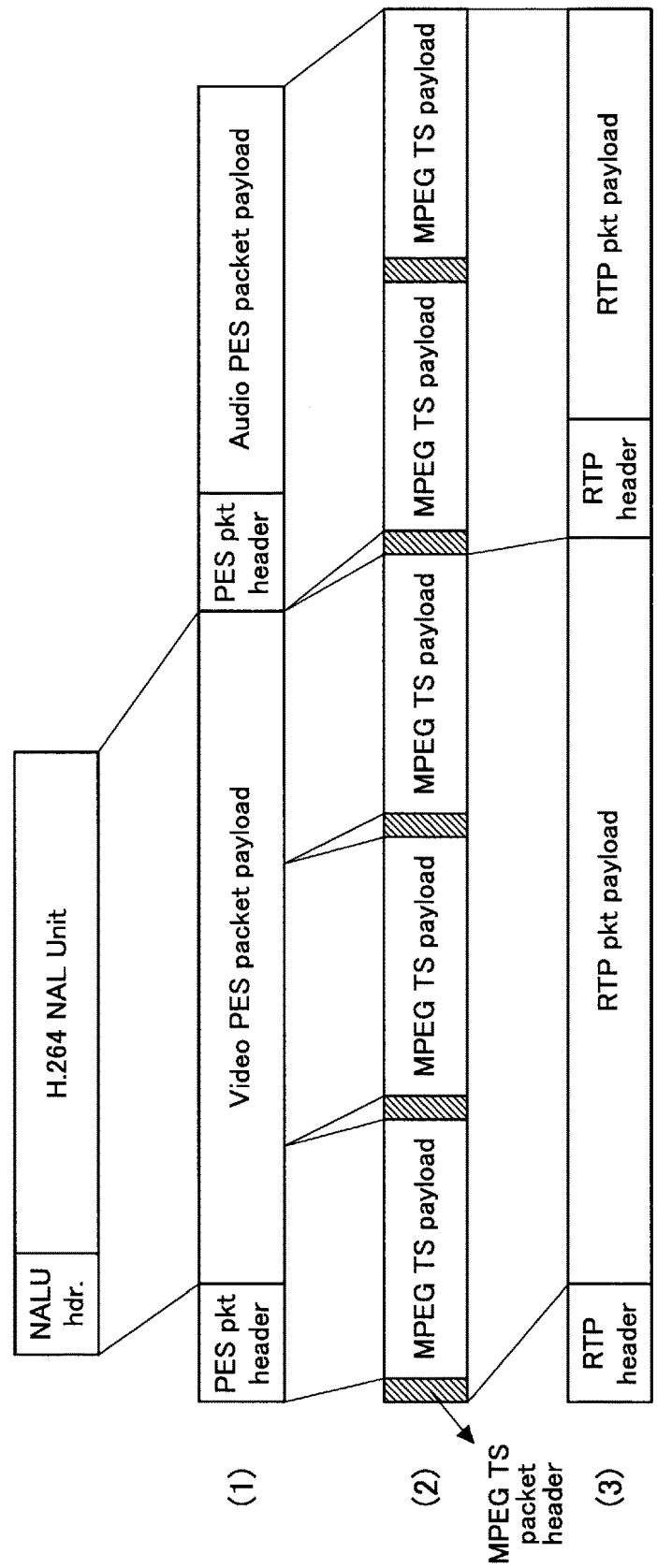
FIG. 9 is an explanatory view illustrating a packet structure.

The TS multiplexer 235 generates a TS stream composed of TS header and TS payload as shown in (2) of FIG. 9. Note that the TS payload is obtained by dividing the PES packet into 188-byte fixed lengths, for example. The TS stream is transmitted as an RTP packet in which RTP header is added as shown in (3) of FIG. 9.

The wireless communication unit 240 wirelessly transmits the RTP packet containing the image data generated by the packet generation unit 230, the control data designated by the control unit 250 and the like. Further, the wireless communication unit 240 receives information related to the display orientation of the image data on the display unit 12 of the portable device 10.

Note that the control data contains capability information indicating the capability of the PC 20, as described in detail later. Further, the information related to the display orientation of the image data on the display unit 12 of the portable device 10 may be sensor information which varies in accordance with the posture of the display unit 12 (the portable device 10). The wireless communication unit 240 may operate according to Wi-Fi Direct under Wi-Fi Alliance standard development, for example.

The control unit 250 controls the overall operation of the PC 20. For example, the control unit 250 may determine the display orientation of the image data on the display unit 12 of the portable device 10 based on the sensor information received from the portable device 10 and instruct the image generation unit 220 to generate the image data conforming to the display orientation.

The wireless communication unit 140 of the portable device 10 receives the RTP packet containing the image data, the control data containing the capability information of the PC 20 and the like from the PC 20. Further, the wireless communication unit 140 transmits the sensor information indicating the posture of the portable device 10 which is detected by the sensor 160 to the PC 20 at intervals of several hundred ms, for example. Note that the wireless communication unit 140 may transmit the display orientation (0°, 90°, 180°, 270°) which is determined from the sensor information by the control unit 150 and the like. The wireless communication unit 140 may operate according to Wi-Fi Direct under Wi-Fi Alliance standard development, for example.

The decoder 130 interprets the RTP packet received by the wireless communication unit 140 and decodes the image data and the like contained in the RTP packet. The display unit 12 displays the image data decoded by the decoder 130 in the display orientation designated by the control unit 150. This is described later with reference to FIGS. 10 and 11.

The control unit 150 controls the overall operation of the portable device 10. For example, the control unit 150 instructs to the wireless communication unit 140 to transmit the capability information, the sensor information and the like or controls the image data decoded by the decoder 130 according to the display orientation of the portable device 10. Specifically, the control unit 150 displays a portrait image when the portable device 10 is vertically oriented and displays a landscape image when the portable device 10 is horizontally oriented.

The sensor 160 detects a physical quantity (sensor information) indicating the posture of the portable device 10. For example, the sensor 160 may be any one of an acceleration sensor, a gyroscope and an angular velocity sensor, or a combination of those.

Specific examples of images which are displayed according to the embodiment of the disclosure are described hereinafter with reference to FIGS. 10 and 11.

Figure 10:
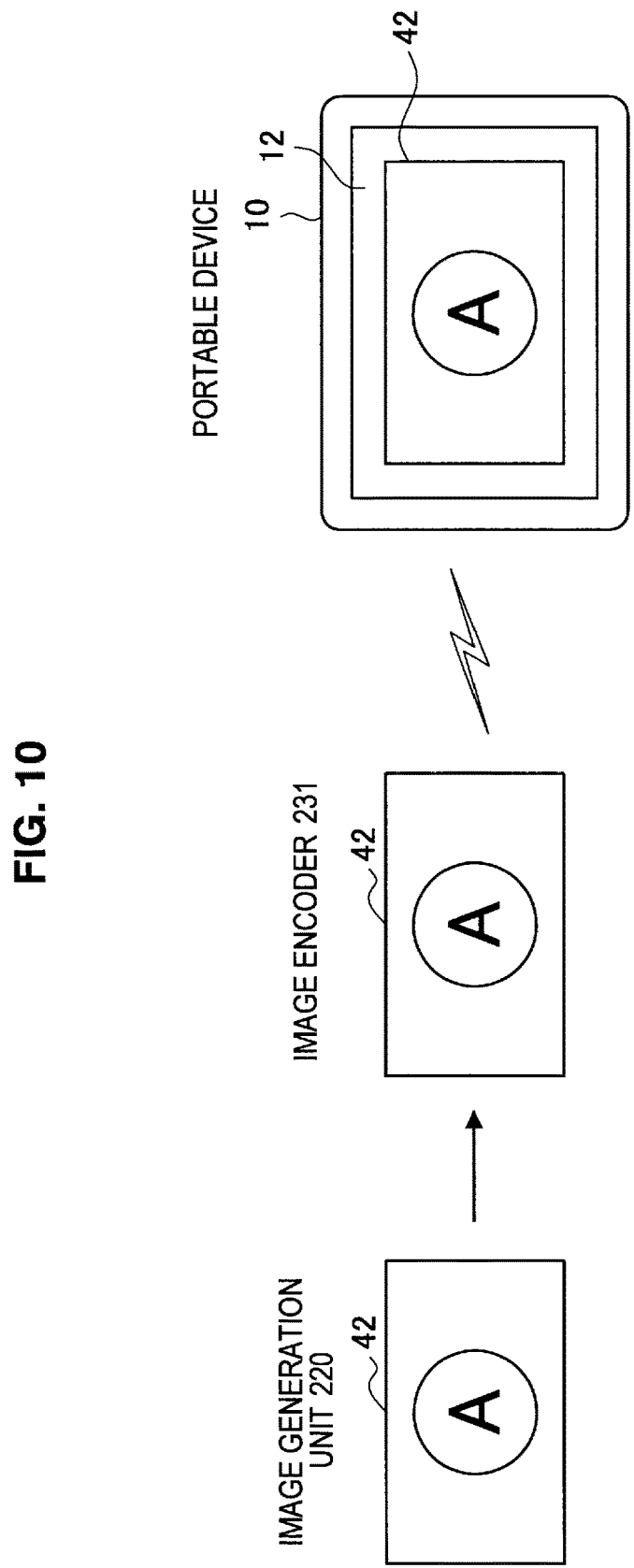
FIG. 10 is an explanatory view illustrating a specific example of an image when the display orientation of a portable device is horizontal.

FIG. 10 is an explanatory view illustrating a specific example of an image in the case where the display orientation of the portable device 10 is horizontal. When the control unit 250 of the PC 20 determines that the display orientation of the portable device 10 is horizontal based on the sensor information received from the portable device 10, the control unit 250 instructs the image generation unit 220 to generate an image tailored to landscape. In response to the instruction, the image generation unit 220 generates a landscape image 42 as shown in FIG. 10. The image encoder 231 then encodes the image 42 generated by the image generation unit 220.

After that, the portable device 10 receives the encoded image 42 from the PC 20, and then decodes the image 42 and displays it on the display unit 12 as shown in FIG. 10.

Figure 11:
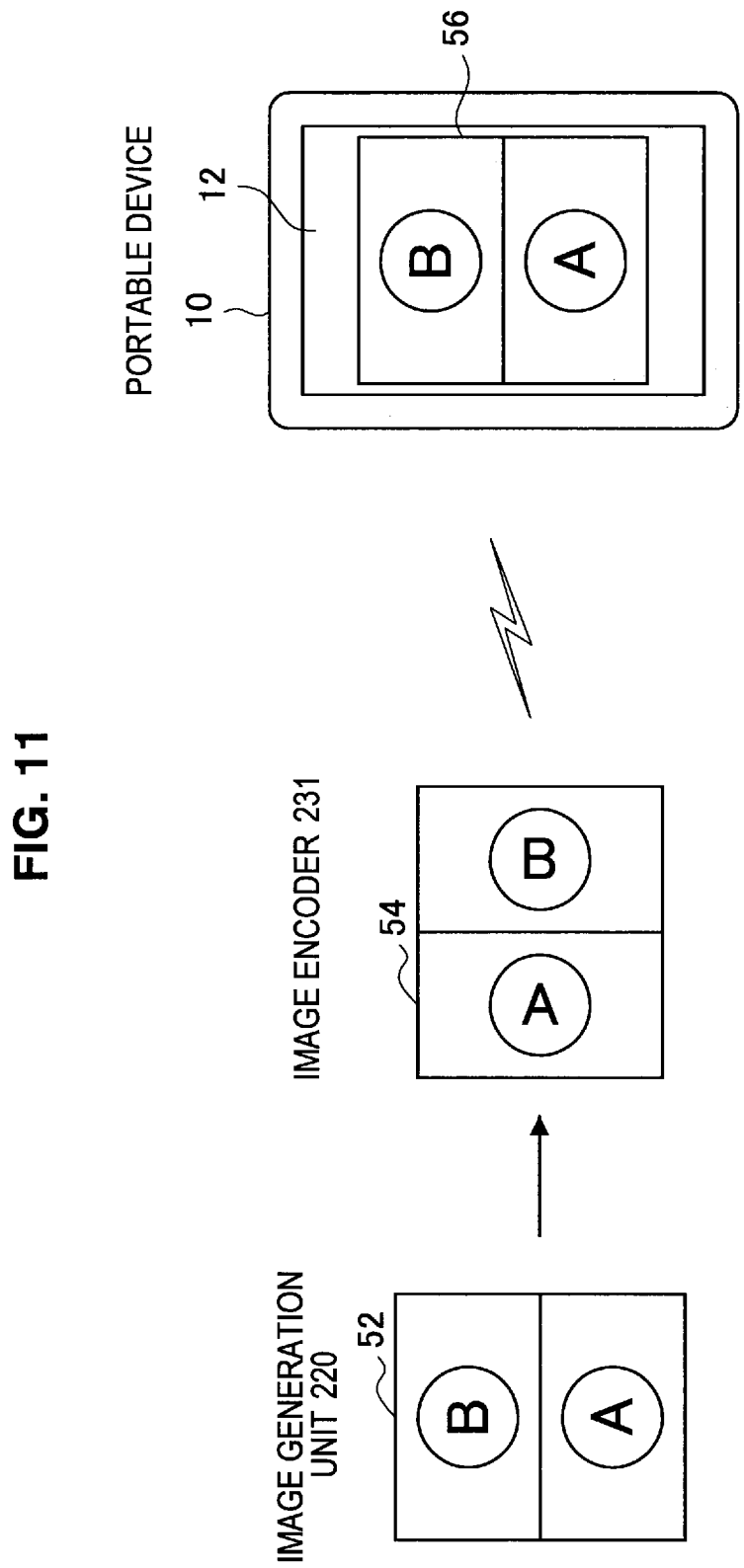
FIG. 11 is an explanatory view illustrating a specific example of an image when the display orientation of a portable device is vertical.

FIG. 11 is an explanatory view illustrating a specific example of an image in the case where the display orientation of the portable device 10 is vertical. When the control unit 250 of the PC 20 determines that the display orientation of the portable device 10 is vertical based on the sensor information received from the portable device 10, the control unit 250 instructs the image generation unit 220 to generate an image tailored to portrait. In response to the instruction, the image generation unit 220 generates a portrait image 52 as shown in FIG. 11.

Then, the image generation unit 220 supplies an image 54 obtained by rotating the image 52 by 90 degrees to the image encoder 231, and the image encoder 231 encodes the image 54. After that, the portable device 10 receives the encoded image 54 from the PC 20, and then decodes the image 54 and displays an image 56 obtained by rotating the image 54 in accordance with the posture of the portable device 10 on the display unit 12 as shown in FIG. 11.

Note that the PC 20 may describe information designating the display orientation in the header of the image data, and, in this case, the portable device 10 may display the image data in the display orientation designated in the header by flipping the image data vertically or horizontally or rotating the image data.

As described specifically above with reference to FIGS. 10 and 11, according to the embodiment of the disclosure, the PC 20 transmits the image data conforming to the display orientation of the portable device 10, and the portable device 10 can thereby receive and display the image data which fits the display orientation.

Note that, assume the case where there are four different display orientations, 0 degree, 90 degrees, 180 degrees and 270 degrees with respect to a certain angle, in the portable device 10. In such a case, when the display orientation is 0 degree or 180 degrees, the same image data may be input to the image encoder 231, and, when the display orientation is 90 degrees or 270 degrees, the same image data may be input to the image encoder 231. In this case, the image data can be displayed appropriately by flipping the image data vertically or horizontally in the portable device 10. Alternatively, in order to eliminate the need for the flipping in the portable device 10, the image data different among the display orientations may be input to the image encoder 231.

4. Operation of Image Display System

The operation of the image display system 1 according to the embodiment of the disclosure is described hereinafter with reference to FIG. 12.

Figure 12:
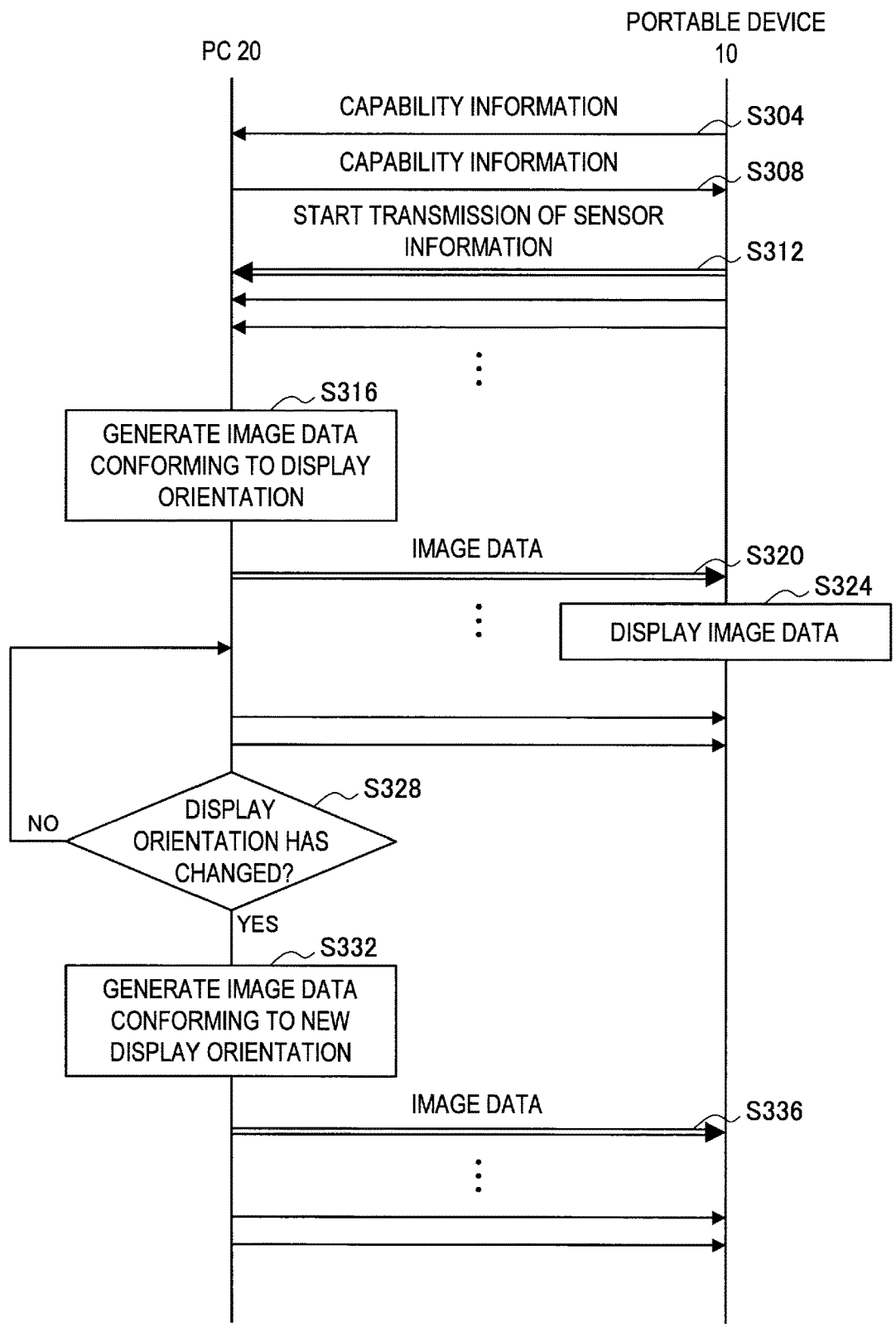
FIG. 12 is a sequence chart illustrating an operation of an image display system according to an embodiment of the present disclosure.

FIG. 12 is a sequence chart illustrating the operation of the image display system 1 according to the embodiment of the present disclosure. Referring to FIG. 12, when a wireless connection between the PC 20 and the portable device 10 is established, the portable device 10 transmits capability information indicating having a display change function of changing the display orientation in accordance with the posture to the PC 20 (S304). The PC 20 receives the capability information and then transmits capability information indicating having a function of generating and transmitting a screen conforming to the display orientation of the portable device 10 to the portable device 10 (S308).

The portable device 10 recognizes that the PC 20 has the function of generating and transmitting a screen conforming to the display orientation of the portable device 10 based on the capability information received in S308, and then starts periodic transmission of the sensor information obtained by the sensor 160 (S312).

Then, the image generation unit 220 of the PC 20 generates image data that fits the display orientation of the portable device 10 which is determined by the control unit 250 based on the sensor information (S316), and the wireless communication unit 240 transmits the image data to the portable device 10 (S320). The portable device 10 displays the image data received from the PC 20 by rotating or flipping the image data in accordance with the posture of the portable device 10 (S324).

After that, when the control unit 250 of the PC 20 determines that the display orientation of the portable device 10 has changed based on the sensor information received from the portable device 10 (S328), the control unit 250 instructs the image generation unit 220 to generate image data that fits the new display orientation (S332). Consequently, the image data that fits the new display orientation is transmitted from the PC 20, and the portable device 10 displays the image data that fits the new display orientation (S336).

5. Second Embodiment

Next, a second embodiment of the present disclosure is described with reference to FIGS. 14 to 22. According to the second embodiment of the disclosure, display control according to the display orientation of the portable device 10 is applicable also to a frame image composed of a first image and a second image, such as 3D display.

Figure 14:
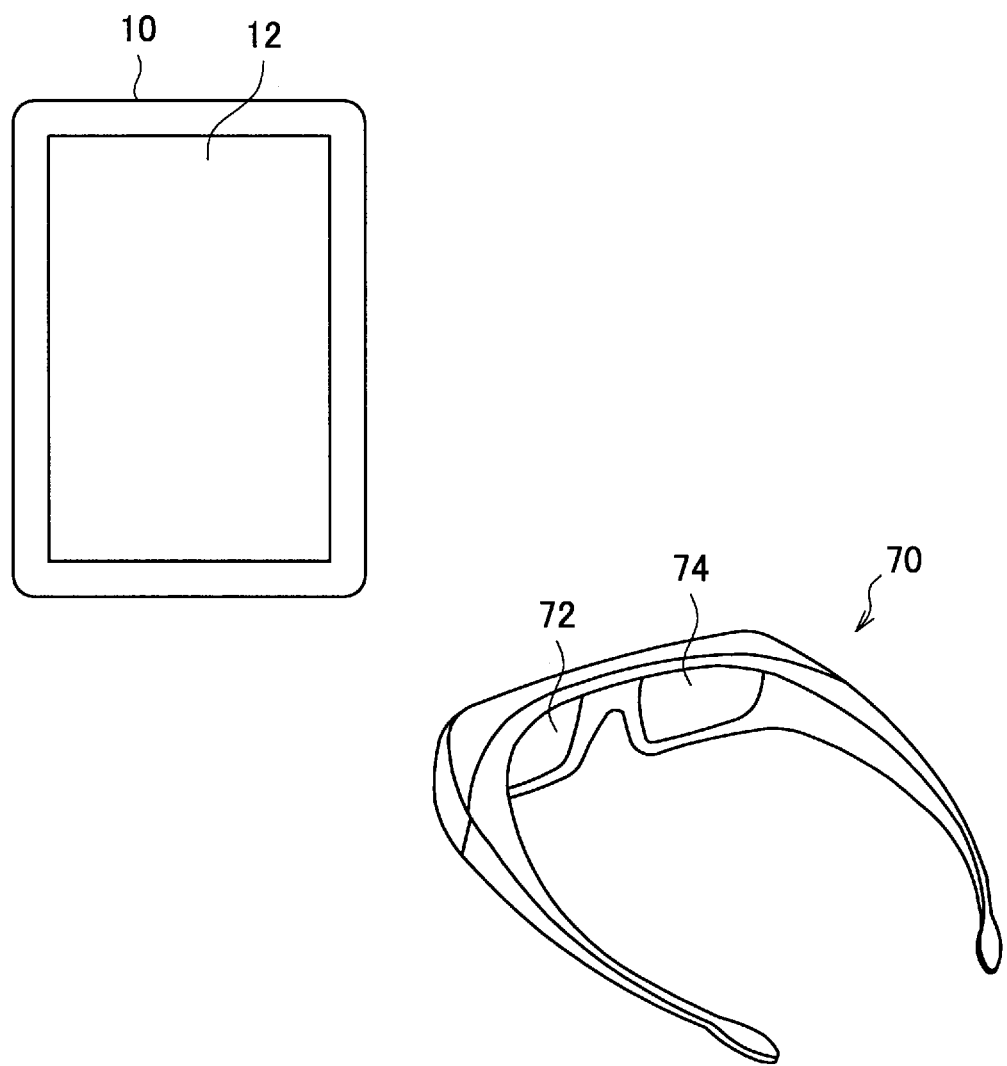
FIG. 14 is an explanatory view illustrating a second embodiment of the present disclosure.

FIG. 14 is an explanatory view illustrating a second embodiment of the present disclosure. The display unit of the portable device 10 according to the second embodiment displays a left eye image and a right eye image. A user can perceive the left eye image and the right eye image displayed on the portable device 10 as a 3D image by wearing 3D glasses 70 as shown in FIG. 14.

The display unit 12 according to the second embodiment supports display mode that allocates a left eye image or a right eye image to each scan line (which is referred to hereinafter as retarder mode). The retarder mode is described hereinafter in further detail with reference to FIGS. 15 and 16.

(Retarder Mode)

Figure 15:
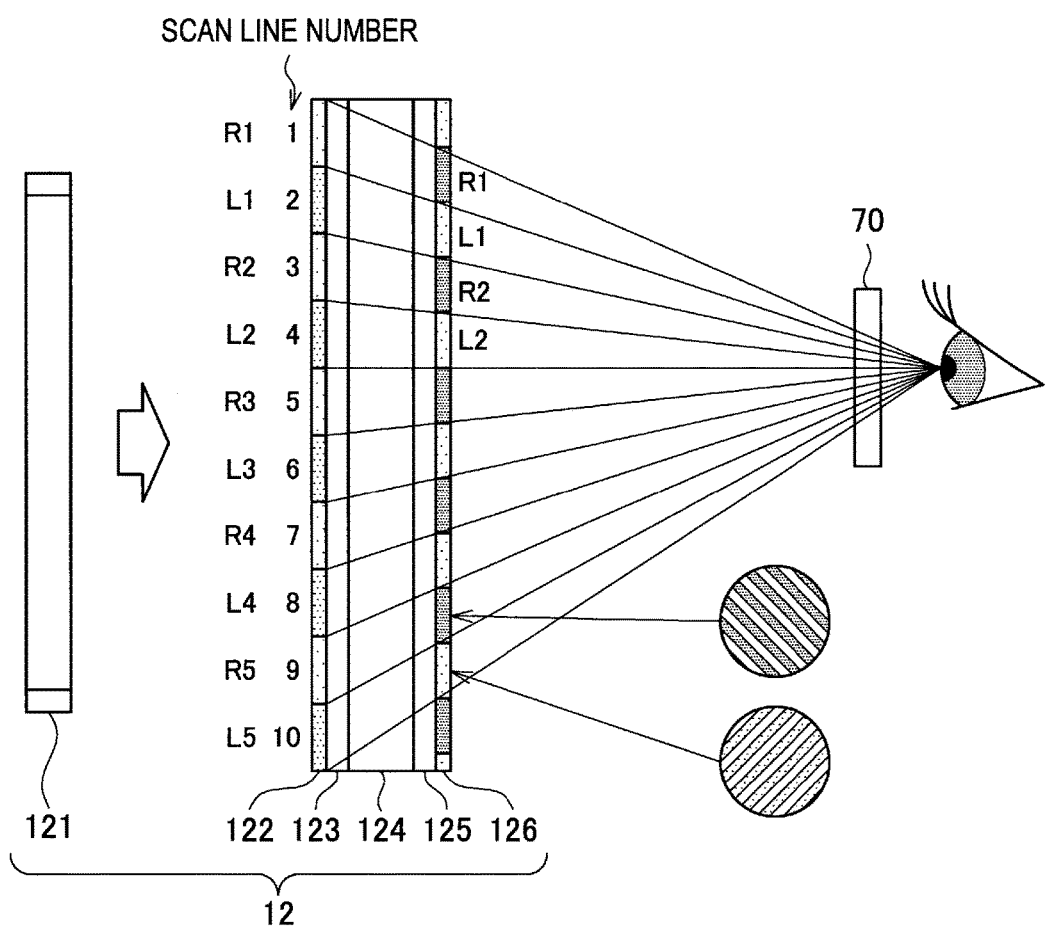
FIG. 15 is an explanatory view illustrating a configuration of a display unit 12.

FIG. 15 is an explanatory view illustrating a configuration of the display unit 12. Referring to FIG. 15, the display unit 12 includes a backlight 121, a flat display panel 122, an adhesive layer 123, a glass substrate 124, an alignment layer 125, and a liquid crystal polymer layer 126.

The backlight 121 is placed at the back of the flat display panel 122 and applies light to the flat display panel 122 from the back. The backlight 121 may be LED that emits linearly polarized light, for example. Note that the display unit 12 may be a display that does not include the backlight 121, such as an organic EL display or PDP.

The flat display panel 122 has a plurality of scan lines and displays an image by sequentially scanning the plurality of scan lines. Further, when performing 3D display, a left eye image or a right eye image is allocated to each scan line of the flat display panel 122. For example, a right eye image (R1, R2, R3, . . . ) is allocated to odd-number scan lines (1, 3, 5, . . . ), and a left eye image (L1, L2, L3, . . . ) is allocated to even-number scan lines (2, 4, 6, . . . ) as shown in FIG. 15.

The liquid crystal polymer layer 126 has a plurality of polarization lines that convert light coming from the flat display panel 122 into circularly polarized light. For example, as shown in FIG. 15, the polarization lines (R1, R2, . . . ) corresponding to the odd-number scan lines have a linear pattern of −45° for right hand circular polarization, and he polarization lines (L1, L2, . . . ) corresponding to the even-number scan lines have a linear pattern of +45° for left hand circular polarization. Note that the adhesive layer 123, the glass substrate 124, the alignment layer 125 and the like are placed between the liquid crystal polymer layer 126 and the flat display panel 122.

Figure 16:
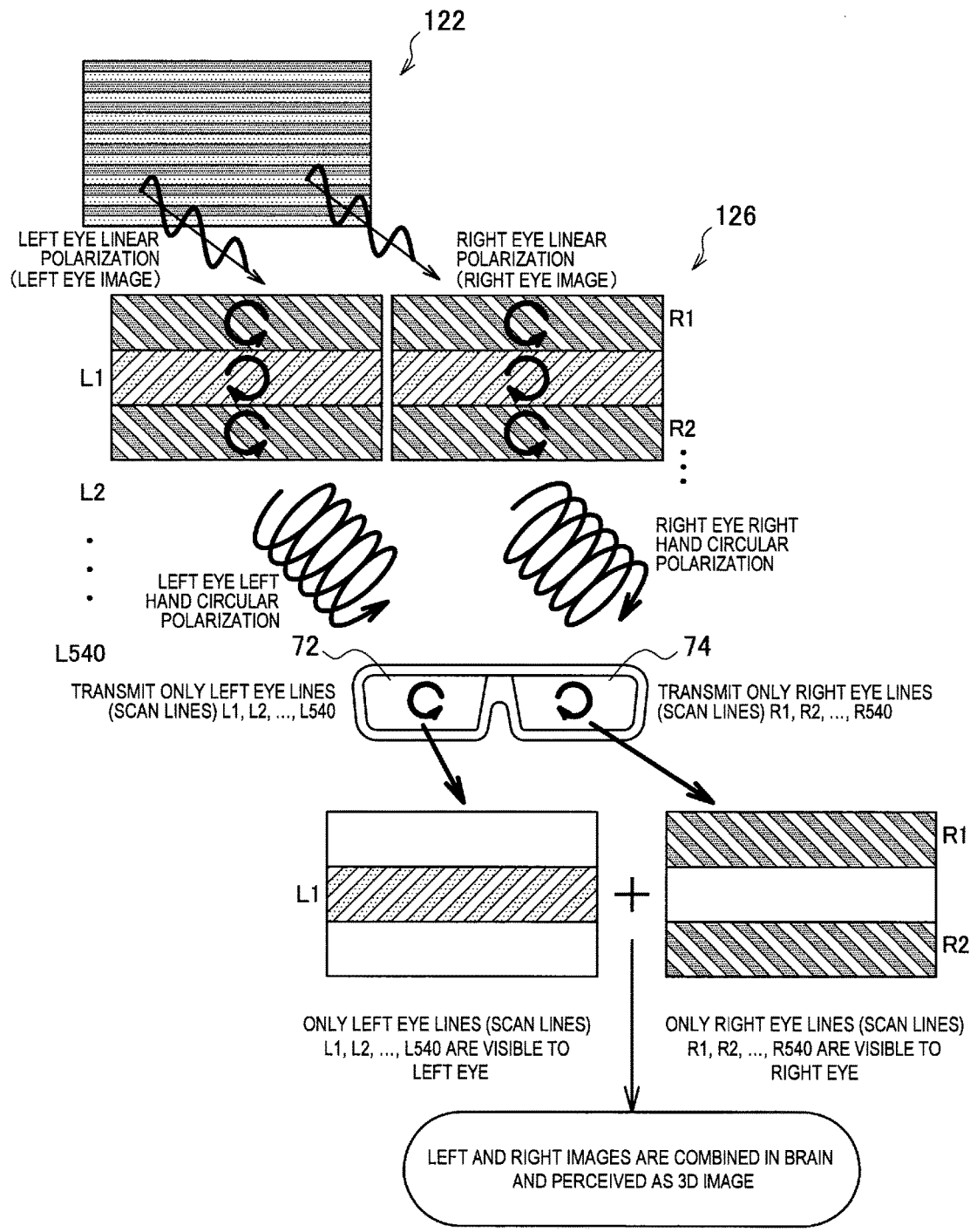
FIG. 16 is an explanatory view illustrating a polarization function by a liquid crystal polymer layer 126 and 3D glasses 70.

FIG. 16 is an explanatory view illustrating a polarization function by the liquid crystal polymer layer 126 and the 3D glasses 70. As shown in FIG. 16, the flat display panel 122 displays a right eye image and a left eye image, which are linear polarization. Then, the right eye image is converted into right hand circular polarization by the polarization lines R1, R2, . . . of the liquid crystal polymer layer 126. Likewise, the left eye image is converted into left hand circular polarization by the polarization lines L1, L2, . . . of the liquid crystal polymer layer 126. Note that, although 1080 polarization lines, for example, are formed in the liquid crystal polymer layer 126 in practice, only three polarization lines are shown in a magnified scale in FIG. 16.

Figure 17:
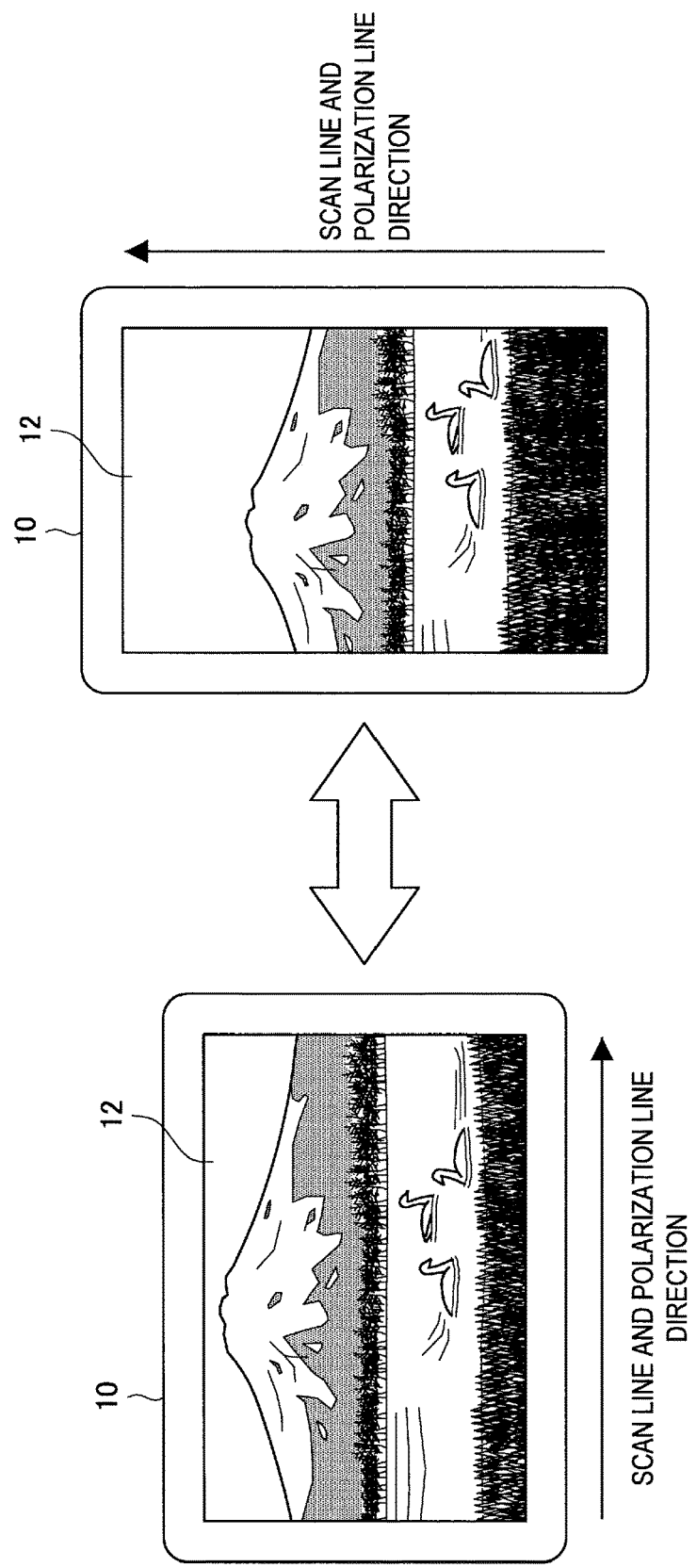
FIG. 17 is an explanatory view illustrating a change in display orientation.

Then, a right eye image transmission part 74 of the circular polarization 3D glasses 70 transmits only the right-hand circularly polarized right eye image, and thereby the right eye image (R1, R2, . . . ) reaches the right eye of a user. On the other hand, a left eye image transmission part 72 of the 3D glasses 70 transmits only the left-hand circularly polarized left eye image, and thereby the left eye image (L1, L2, . . . ) reaches the left eye of a user. The right eye image and the left eye image are combined in the user's brain and thereby perceived as a 3D image As described above, the portable device 10 according to the second embodiment can display the image in 3D by the retarder mode, for example. Further, the portable device 10 has a function of changing the display orientation of the image in accordance with the orientation of the portable device 10 as described in the first embodiment. For example, when the portable device 10 is in the horizontal posture as shown in FIG. 17, the portable device 10 displays the image in the horizontal orientation (landscape) in such a way that the horizontal direction of the image coincides with the direction along which the scan lines and the polarization lines are formed. On the other hand, when the portable device is in the vertical posture as shown in FIG. 17, the portable device 10 displays the image in the vertical orientation (portrait) in such a way that the horizontal direction of the image intersects with the direction along which the scan lines and the polarization lines are formed.

(3D Mode)

The portable device 10 receives 3D image data composed of a right eye image and a left eye image from the PC 20 and allocates the right eye image and the left eye image to operating lines, thereby allowing a user to perceive the 3D image. The mode of 3D image data transmitted from the PC 20 includes top-and-bottom and side-by-side.

Figure 18:
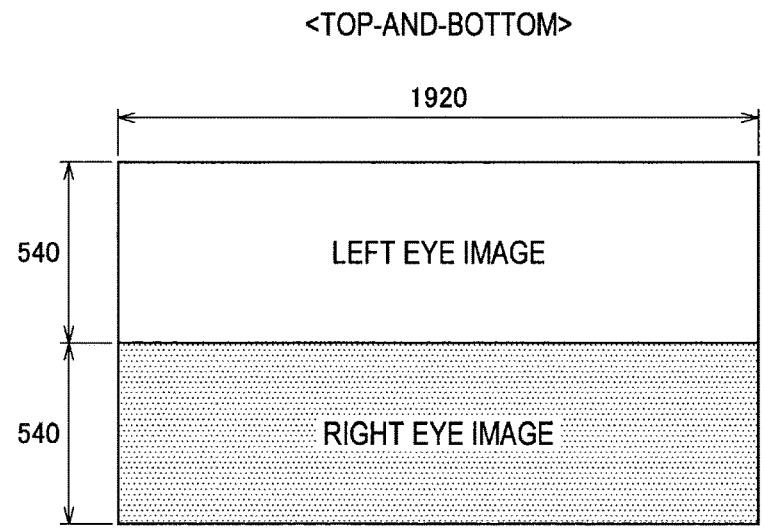
FIG. 18 is an explanatory view illustrating top-and-bottom mode.

In the top-and-bottom mode, the PC 20 generates the 3D image data in which the right eye image and the left eye image are arranged vertically as shown in FIG. 18. Therefore, in top-and-bottom, the vertical resolution of each of the right eye image and the left eye image is half that of normal one frame in principle.

Figure 19:
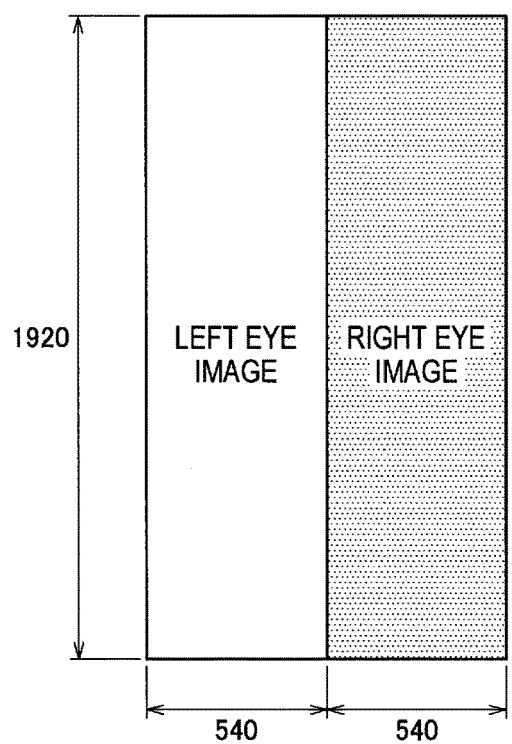
FIG. 19 is an explanatory view illustrating side-by-side mode.

In the side-by-side mode, on the other hand, the PC 20 generates the 3D image data in which the right eye image and the left eye image are arranged horizontally as shown in FIG. 19. Therefore, in side-by-side, the horizontal resolution of each of the right eye image and the left eye image is half that of normal one frame in principle.

Because the vertical resolution and the horizontal resolution differ depending on 3D mode such as top-and-bottom or side-by-side as described above, it is desirable to appropriately select 3D mode.

Given such circumstances, the second embodiment of the present disclosure has been invented. According to the second embodiment of the present disclosure, the PC 20 can transmit 3D image data to the portable device 10 by using 3D mode conforming to the display orientation of the portable device 10. The second embodiment of the present disclosure is described hereinafter in detail.

(Functions of Portable Device 10 and PC 20 According to Second Embodiment)

The portable device 10 and the PC 20 according to the second embodiment have a function for 3D display in addition to the functions of the elements or in placed of some functions of the elements described earlier in the first embodiment with reference to FIG. 7. The function for 3D display which is different from the first embodiment is described hereinafter by referring back to FIG. 7.

The wireless communication unit 240 of the PC 20 receives information indicating 3D mode from the portable device 10. For example, the wireless communication unit 240 of the PC 20 receives information indicating top-and-bottom or side-by-side as 3D mode. Note that, in addition to the information indicating 3D mode, the wireless communication unit 240 of the PC 20 may receive information related to the display orientation of image data on the display unit 12 of the portable device 10. Further, the wireless communication unit 240 transmits RTP packet containing the 3D image data generated by the packet generation unit 230.

The control unit 250 instructs the image generation unit 220 to generate image data in the 3D mode which is indicated by the information received from the portable device 10. For example, when information indicating top-and-bottom is received by the wireless communication unit 240, the control unit 250 instructs the image generation unit 220 to generate image data in top-and-bottom mode.

The image generation unit 220 generates 3D image data in the 3D mode which is designated by the control unit 250. For example, when top-and-bottom mode is designated, the image generation unit 220 generates 3D image data in which the right eye image and the left eye image are arranged vertically as shown in FIG. 18. On the other hand, when side-by-side mode is designated, the image generation unit 220 generates 3D image data in which the right eye image and the left eye image are arranged horizontally as shown in FIG. 19.

As described above, the PC 20 according to the second embodiment can transmit the 3D image data generated according to the 3D mode which is designated by the portable device 10 to the portable device 10. Note that, even when 3D mode is not explicitly designated by the portable device 10, if the PC 20 according to the second embodiment receives information related to the display orientation of an image on the display unit 12 of the portable device 10, the PC 20 may determine appropriate 3D mode based on the display orientation of the image.

On the other hand, the control unit 150 of the portable device 10 controls the display orientation of the image on the display unit 12 based on the sensor information which is detected by the sensor 160. Further, the control unit 150 selects appropriate 3D mode in terms of resolution according to the display orientation of the image on the display unit 12.

For example, when the display orientation of an image on the display unit 12 is horizontal, the control unit 150 selects top-and-bottom. On the other hand, when the display orientation of an image on the display unit 12 is vertical, the control unit 150 selects side-by-side.

Note that, when it is known that the PC 20 does not support 3D mode as a result of exchange of the capability information, the control unit 150 may request transmission of image data in 2D from the wireless communication unit 140.

Then, the wireless communication unit 140 of the portable device 10 transmits information indicating 3D mode selected by the control unit 150 to the PC 20. Further, the wireless communication unit 140 of the portable device 10 receives 3D image data conforming to the 3D mode which is selected by the control unit 150 from the PC 20.

The above-described function of the portable device allows selection of top-and-bottom when the display orientation is horizontal, and side-by-side when the display orientation is vertical, thereby preventing the degradation of the resolution of the 3D image. This is described specifically with reference to FIGS. 20 and 21.

Figure 20:
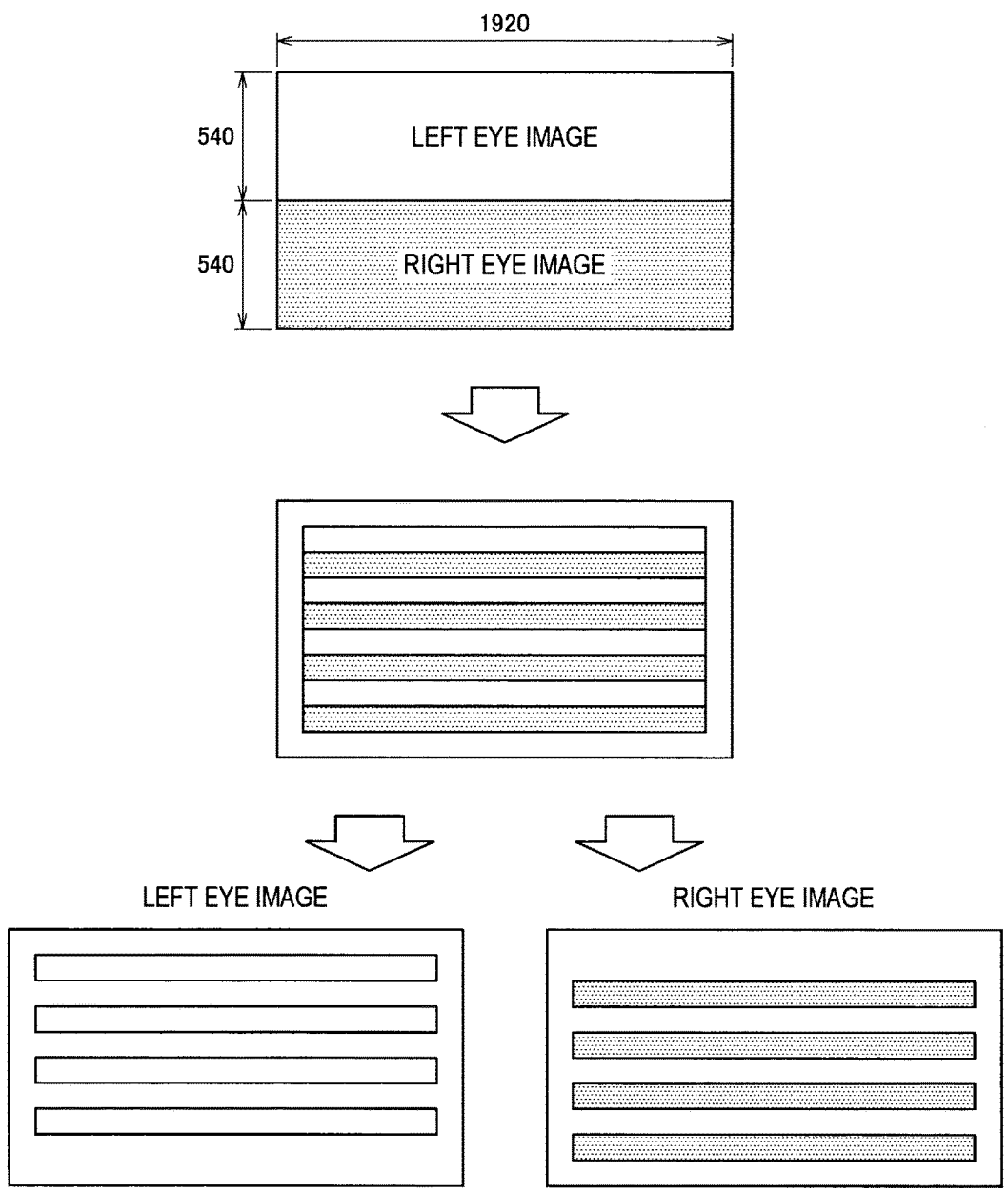
FIG. 20 is an explanatory view illustrating a case where the display orientation of an image on a display unit 12 is horizontal.

FIG. 20 is an explanatory view illustrating the case where the display orientation of an image on the display unit 12 is horizontal. When the display orientation of an image on the display unit 12 is horizontal, a left eye image and a right eye image contained in 3D image data conforming to top-and-bottom mode are allocated alternately in the vertical direction as shown in FIG. 20. Although FIG. 20 shows an example in which the left eye image and the right eye image are displayed in four lines each for convenience of description, they are displayed in 540 lines each in practice. Therefore, an advantage that the degradation of the vertical resolution does not occur in both of the left eye image and the right eye image is obtained.

FIG. 21 is an explanatory view illustrating the case where the display orientation of an image on the display unit 12 is vertical. When the display orientation of an image on the display unit 12 is vertical, a left eye image and a right eye image contained in 3D image data conforming to side-by-side mode are allocated alternately in the horizontal direction as shown in FIG. 21. Although FIG. 21 shows an example in which the left eye image and the right eye image are displayed in four lines each for convenience of description, they are displayed in 540 lines each in practice. Therefore, an advantage that the degradation of the horizontal resolution does not occur in both of the left eye image and the right eye image is obtained.

(Operations of Portable Device 10 and PC 20 According to Second Embodiment)

The functions of the portable device 10 and the PC according to the second embodiment are described above. Next, the operations of the portable device 10 and the PC 20 according to the second embodiment are described with reference to FIG. 22.

FIG. 22 is a sequence chart illustrating the operations of the portable device 10 and the PC 20 according to the second embodiment. Referring to FIG. 22, when a wireless connection between the PC 20 and the portable device 10 is established, the portable device 10 transmits capability information indicating having a display change function of changing the display orientation in accordance with the posture and having a function of designating 3D mode conforming to the display orientation to the PC 20 (S404). The PC 20 receives the capability information and then transmits the display orientation of the portable device 10 and capability information indicating having a function of generating and transmitting image data conforming to the designated 3D mode to the portable device 10 (S408).

The portable device 10 recognizes the display orientation of the portable device 10 and that the PC 20 has the function of generating and transmitting image data conforming to the designated 3D mode based on the capability information received in S408, and then executes processing of S412 to S420 at predetermined intervals.

Specifically, the control unit 150 of the portable device 10 determines the display orientation of the image data based on the sensor information (S412), and selects 3D mode conforming to the display orientation (S416). Then, the wireless communication unit 140 of the portable device 10 supplies information indicating the display orientation of the image data and information indicating the selected 3D mode to the PC 20 (S420). Note that the portable device 10 may perform the above-described processing of S412 to S420 every frame or at intervals of several hundred ms.

Then, the PC 20 generates 3D image data according to the notified 3D mode (S424) and transmits the generated 3D image data to the portable device 10 (S428). After that, the display unit 12 of the portable device 10 displays the 3D image data received from the PC 20 according to control by the control unit 150 (S432).

6. Summary

As described above, according to the embodiment of the present disclosure, the portable device 10 and the PC 20 exchange the capability information, and, when the both have a function of accommodating a change in display orientation, the portable device 10 starts transmission of the sensor information related to the display orientation.

The PC 20 can thereby determine the display orientation of the portable device 10 based on the sensor information, generate image data of which the layout and the resolution fit the display orientation of the portable device 10, and transmit the image data to the portable device 10. As a result, when the portable device 10 displays the image data transmitted from the PC 20, the portable device 10 can display the image data that fits the display orientation.

Further, although vertical or horizontal flipping of an image is generally done by changing the sequence of reading from a buffer that stores decoding output, in the case where image data is transmitted by slice transmission, decoding results of slices are immediately rendered, and therefore vertical or horizontal flipping by changing the reading sequence from a buffer is not available. Regarding this point, according to the embodiment of the present disclosure, an image can be flipped vertically or horizontally by turning the addressing direction of writing to the display unit 12, and therefore low delay can be achieved when using the slice transmission of image data as well.

Further, according to the second embodiment of the present disclosure, by selecting top-and-bottom when the display orientation is horizontal and selecting side-by-side when the display orientation is vertical, it is possible to prevent the degradation of the resolution of a 3D image.

Although a preferred embodiment of the present disclosure is described in detail with reference to the appended drawings, the scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, although an example in which the PC 20 generates and transmits image data conforming to the display orientation is described above, the scope of the present disclosure is not limited to such an example. As an alternative example, the PC 20 may generate image data in which a plurality of image elements that fit the display orientation are combined (e.g., 1920×1920, 2160×1920 etc.), and the portable device 10 may display the image data using the image element conforming to the display orientation. This is described more specifically with reference to FIG. 13.

Figure 13:
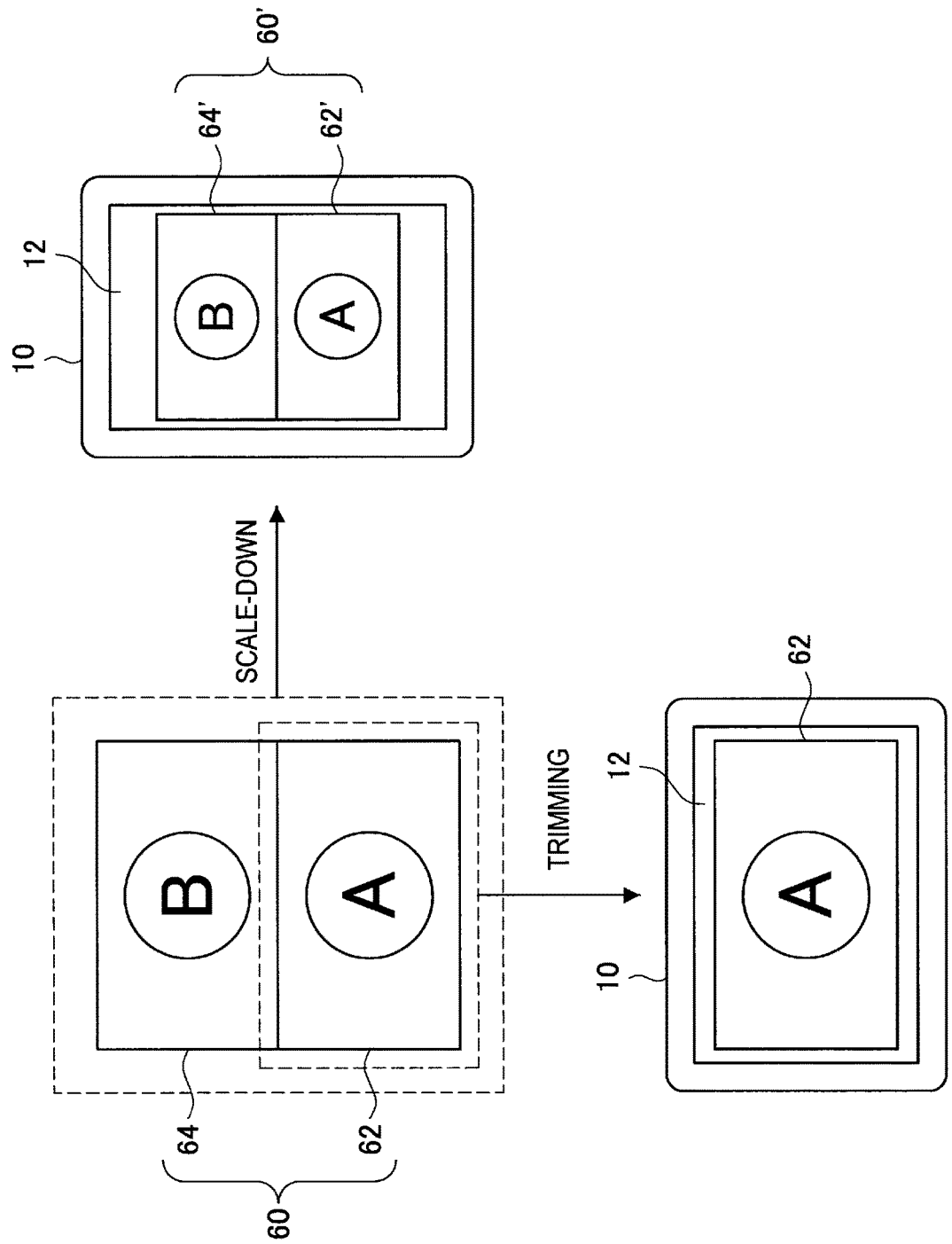
FIG. 13 is an explanatory view illustrating an alternative example of an embodiment of the present disclosure.

FIG. 13 is an explanatory view illustrating an alternative example of an embodiment of the present disclosure. As shown in FIG. 13, the PC 20 generates image data 60 composed of an image element 62 and an image element 64 and transmits the image data 60 to the portable device 10. The portable device 10 displays the image data using the image element conforming to the display orientation out of the image data. For example, when the display orientation is horizontal, the portable device 10 trims away the image element 64 and displays the image data. On the other hand, when the display orientation is vertical, the portable device 10 thins out the image data 60 to be scaled down to an image 60' and displays the image 60'.

According to the alternative example, a change in the detail of processing accompanying a change in the display orientation is completed in the portable device 10, thereby improving response.

Further, it is not always necessary to perform the steps in the processing of the image display system 1 in this specification in chronological order according to the sequence shown in the sequence chart. For example, the steps in the processing of the image display system 1 may be executed in a different sequence from the sequence shown in the sequence chart or executed in parallel.

Furthermore, it is possible to create a computer program that causes hardware such the CPU 201, the ROM 202 and the RAM 203 included in the portable device 10 and the PC 20 to perform the functions equal to the elements of the portable device 10 and the PC 20 described above. Further, a storage medium that stores such a computer program may be provided.

Further, the following configurations are also within the scope of the present disclosure.

(1) An image generation device including:

an image generation unit that generates image data; and a communication unit that transmits the image data to an image display device and receives information related to a display orientation of the image data on a display surface of the image display device, wherein the image generation unit generates the image data according to the information related to the display orientation received by the communication unit.

(2) The image generation device according to the above (1), wherein the display orientation of the image data on the display surface of the image display device is changed in accordance with a posture of the image display device, and the information related to the display orientation is information indicating the posture of the image display device.

(3) The image generation device according to the above (1) or (2), wherein the image generation unit generates the image data to fit the display orientation specified by the information related to the display orientation.

(4) The image generation device according to any one of the above (1) to (3), wherein the communication unit receives capability information indicating whether the image display device has a display change function of changing the display orientation of the image data in accordance with a posture of the image display device, and the image generation unit generates the image data according to the information related to the display orientation when the capability information indicates that the image display device has the display change function.

(5) The image generation device according to any one of the above (1) to (4), wherein the communication unit transmits information indicating that the image generation device has a function of generating the image data according to the information related to the display orientation to the image display device, and transmission of the information related to the display orientation from the image display device is started based on transmission of the information.

(6) A program causing a computer to function as an image generation device including:

an image generation unit that generates image data; and a communication unit that transmits the image data to an image display device and receives information related to a display orientation of the image data on a display surface of the image display device, wherein the image generation unit generates the image data according to the information related to the display orientation received by the communication unit.

(7) An image display system including:

an image display device including a display unit, and a transmitting unit that transmits information related to a display orientation of image data on the display unit; and an image generation device including an image generation unit that generates image data, and a communication unit that transmits the image data to the image display device and receives the information related to the display orientation, wherein the image generation unit generates the image data according to the information related to the display orientation received by the communication unit.

(8) An image display device including:

a display unit that supports display mode that allocates first image data or second image data to each of scan lines; and a transmitting unit that transmits information designating an arrangement direction of the first image data and the second image data to an image generation device that generates frame image data where the first image data and the second image data are arranged next to each other, wherein the transmitting unit transmits information designating vertical arrangement when a horizontal direction of image data displayed on the display unit coincides with a direction along which the scan lines are formed, and transmits information designating horizontal arrangement when the horizontal direction of the image data intersects with the direction along which the scan lines are formed.

What is claimed is:

1. An information processing device in a wireless communication system, comprising:
    circuitry configured to:
        receive current orientation information and rotation capability information from a receiver that displays one or more images on a display, the current orientation information indicating a current orientation of the display of the receiver and the rotation capability information indicating whether the receiver is capable of rotating the image on the display associated with a change in posture of the receiver,
        transmit function capability information to the receiver indicating a function of generating image data that conforms to an orientation of the receiver in response to the receipt of the rotation capability information from the receiver,
        generate image data in accordance with the current orientation information or the rotation capability information received at the information processing device, and
        output the generated image data to the receiver that uses at least one of Wi-Fi direct or a direct communication technique usable even when the information processing device and the receiver are connected to a same access point, in which in one case the generated image data corresponds to an image which, upon display on the display of the receiver, conforms to the current orientation of the display of the receiver.

2. The information processing device according to claim 1, in which the direct communication technique conforms to a TDLS (Tunneled Direct Link Setup) standard.

3. The information processing device according to claim 1, in which the display of the receiver has a plurality of available orientations including a landscape orientation and a portrait orientation, and
    in which when the display of the receiver is in one of the landscape orientation or the portrait landscape orientation and is rotated so that a new current orientation of the display is the other of the landscape orientation or the portrait landscape orientation, the circuitry is configured to automatically generate the image data in accordance with the new current orientation of the display such that the image corresponding thereto is tailored to or conforms to the respective one of the landscape orientation or the portrait landscape orientation.

4. The information processing device according to claim 1, in which a predetermined rotation capability of the receiver involves performing a display change function on the generated image data to enable the image corresponding thereto to be displayed on the display of the receiver in a manner so as to conform to or be tailored to the current orientation of the display of the receiver.

5. The information processing device according to claim 1, in which the current orientation information is different from the rotation capability information.

6. The information processing device according to claim 1, wherein the current orientation information and rotation capability information are transmitted via a TCP protocol and the image data is transmitted via a UDP protocol.

7. The information processing device according to claim 1, wherein the current orientation information is determined based on acceleration data detected by an acceleration sensor.

8. The information processing device according to claim 1, wherein the current orientation information is determined based on sensor information detected by a gyroscope.

9. An information processing device usable in wireless communication system, said information processing device comprising:
    circuitry, including a central processing computer (CPU) and a memory having a computer readable program stored therein for use by the CPU, which during operation is configured to:
    enable current orientation information and rotation capability information transmitted wirelessly from a receiver to be received, the receiver having a display unit on which an image is displayable, the current orientation information indicates a current orientation of the display unit of the receiver, and the rotation capability information indicates whether the receiver is capable of rotating the image on the display unit associated with rotation of posture of the receiver,
    enable transmission of function capability information indicating a function of generating image data that conforms to an orientation of the receiver in response to receipt of the rotation capability information from the receiver,
    cause image data to be generated in accordance with the current orientation information or the rotation capability information received from the receiver, and
    cause the generated image data to be transmitted wirelessly for reception by the receiver, and
    wherein communication between the receiver and the information processing device is by way of a direct wireless communication standard.

10. The information processing device according to claim 9,
    in which the display unit of the receiver has a plurality of available orientations including a landscape orientation and a portrait orientation, and
    in which when the display unit of the receiver is in one of the landscape orientation or the portrait landscape orientation and is rotated so that a new current orientation of the display unit is the other of the landscape orientation or the portrait landscape orientation, the circuitry is configured to automatically generate the image data to the revised image data in accordance with the new current orientation of the display such that the image corresponding thereto is tailored to or conforms to the respective one of the landscape orientation or the portrait landscape orientation.

11. The information processing device according to claim 9, wherein the current orientation information and rotation capability information are transmitted via a TCP protocol and the image data is transmitted via a UDP protocol.

12. The information processing device according to claim 9, wherein the current orientation information is determined based on acceleration data detected by an acceleration sensor.

13. The information processing device according to claim 9, wherein the current orientation information is determined based on sensor information detected by a gyroscope.

14. A wireless sink device comprising:
circuitry configured to
transmit rotation capability information to a wireless source device, the rotation capability information corresponding to an orientation of the sink device,
receive control data from the wireless source device,
transmit current orientation information based on the received control data, the current orientation information indicates a posture of the wireless sink device and the control data indicating that the wireless source device includes a function of generating and transmitting an image that conforms to a display orientation of the wireless sink device in response to receipt of the rotation capability information from the sink device, and
receive content data generated by the wireless source device, the content data generated so as to be oriented in accordance with the current orientation information transmitted by the wireless sink device.

15. The information processing device according to claim 14, wherein the current orientation information and rotation capability information are transmitted via a TCP protocol and the content data is transmitted via a UDP protocol.

16. The information processing device according to claim 15, wherein the content data comprises image data.

17. The information processing device according to claim 14, wherein the current orientation information is determined based on acceleration data detected by an acceleration sensor.

18. The information processing device according to claim 14, wherein the current orientation information is determined based on sensor information detected by a gyroscope.

19. An image processing device communicatively coupled to a second device, the information processing device comprising:
a wireless communication unit configured to wirelessly receive control data from the second device and transmit display orientation information and rotation capability information to the second device, the display orientation information being transmitted based on the received control data and providing an indication of the posture of the information processing device and being transmitted via a TCP protocol, the rotation capability information providing an indication of whether the information processing device is capable of rotating an image on a display of the information processing device associated with a change in the posture of the image processing device and transmitted via the TCP protocol, the control data indicating that the second device can generate an image that conforms to a display orientation of the image processing device; and
wherein the wireless communication unit is configured to receive image data from the second device via a UDP protocol.

20. The image processing device according to claim 19, wherein the image data is received over a wireless link, and the display orientation information and rotation capability information are transmitted using the wireless link.

21. The image processing device according to claim 19, wherein the display orientation information provides an indication of the posture as one or more of a portrait orientation or a landscape orientation.

22. The image processing device according to claim 19 further comprising a sensor coupled to the wireless communication unit, the sensor configured to detect the posture of the image processing device and generate sensor information which varies with the posture of the image processing device.

23. The image processing device according to claim 22, wherein the display orientation information is based on the sensor information.

24. The image processing device according to claim 22, wherein the sensor comprises any one of an acceleration sensor, a gyroscope or an angular velocity sensor.

25. The image processing device according to claim 22, wherein the sensor comprises a combination of an acceleration sensor, a gyroscope or an angular velocity sensor.

26. The image processing device according to claim 22, wherein the image processing device determines the display orientation of the received image data based on either the display orientation or rotation capability information transmitted to the second device.

27. The image processing device according to claim 19, further comprising a sensor and a control unit, the control unit being coupled to the sensor and the wireless communication unit so as to control their operation.

28. The image processing device according to claim 19, wherein the image processing device determines the display orientation of the received image data based on either the display orientation or rotation capability information transmitted to the second device.

* * * * *